United States Patent
Yang et al.

(10) Patent No.: US 11,423,379 B2
(45) Date of Patent: Aug. 23, 2022

(54) METHOD FOR UWB TRANSACTION AND ELECTRONIC DEVICE THEREFOR

(71) Applicant: SAMSUNG ELECTRONICS CO., LTD., Suwon-si (KR)

(72) Inventors: Yi Yang, Suwon-si (KR); Jonghoon Jang, Suwon-si (KR); Jiho Shin, Suwon-si (KR); Moonseok Kang, Suwon-si (KR); Hyunchul Kim, Suwon-si (KR); Sejong Yoon, Suwon-si (KR); Jonghyo Lee, Suwon-si (KR); Sehwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 395 days.

(21) Appl. No.: 16/558,614

(22) Filed: Sep. 3, 2019

(65) Prior Publication Data

US 2020/0082370 A1 Mar. 12, 2020

(30) Foreign Application Priority Data

Sep. 7, 2018 (KR) .......... 10-2018-0107359
Dec. 21, 2018 (KR) .......... 10-2018-0167912
(Continued)

(51) Int. Cl.
*G06Q 20/20* (2012.01)
*H04B 1/69* (2011.01)
(Continued)

(52) U.S. Cl.
CPC .......... *G06Q 20/20* (2013.01); *G06F 9/451* (2018.02); *G07C 9/29* (2020.01); *H04B 1/69* (2013.01);
(Continued)

(58) Field of Classification Search
CPC .......... G06Q 20/202; G06Q 20/3226
See application file for complete search history.

(56) References Cited

U.S. PATENT DOCUMENTS 7,499,674 B2 3/2009 Salokannel et al.
7,907,580 B2 3/2011 Ametsitsi
(Continued)

FOREIGN PATENT DOCUMENTS

EP 3248423 10/2020
KR 10-2017-0050986 5/2017
(Continued)

OTHER PUBLICATIONS

Extended Search Report dated Jul. 14, 2021 in EP 19856704.2.
(Continued)

*Primary Examiner* — A. Hunter Wilder
(74) *Attorney, Agent, or Firm* — Nixon & Vanderhye P.C.

(57) ABSTRACT

An electronic device includes communication circuitry configured to perform short-range wireless communication, ultra-wideband (UWB) communication circuitry configured to perform UWB communication, a secure element comprising a secure data storage configured to provide an execution environment isolated from an operating system (OS) of the electronic device, and a processor. The UWB communication circuitry performs ranging with an external electronic device, receives a first UWB signal including a medium access control (MAC) header and a MAC payload from the external electronic device, and determines, based at least on MAC payload information included in the MAC payload, whether to forward information included in the MAC payload information element to the secure element.

20 Claims, 19 Drawing Sheets

(30) Foreign Application Priority Data

Jul. 5, 2019 (KR) .......... 10-2019-0081494
Jul. 26, 2019 (KR) .......... 10-2019-0091278

(51) Int. Cl.
*H04W 4/80* (2018.01)
*G06F 9/451* (2018.01)
*H04W 12/06* (2021.01)
*H04W 4/021* (2018.01)
*G07C 9/29* (2020.01)
*G06F 3/0482* (2013.01)

(52) U.S. Cl.
CPC .......... *H04W 4/021* (2013.01); *H04W 4/80* (2018.02); *H04W 12/06* (2013.01); *G06F 3/0482* (2013.01)

(56) References Cited

U.S. PATENT DOCUMENTS

| | | | |
|---|---|---|---|
| 8,085,830 | B2 | 12/2011 | Ametsitsi |
| 8,150,449 | B2 | 4/2012 | Onozawa |
| 8,451,766 | B2 | 5/2013 | Lee et al. |
| 8,548,519 | B2 | 10/2013 | Onozawa |
| 9,788,151 | B2 | 10/2017 | Duan et al. |
| 10,038,466 | B2 | 7/2018 | Park et al. |
| 10,810,811 | B2 | 10/2020 | Kwon et al. |
| 2005/0058107 | A1 | 3/2005 | Salokannel et al. |
| 2007/0149124 | A1 | 6/2007 | Onozawa |
| 2007/0177495 | A1 | 8/2007 | Ametsitsi |
| 2007/0183424 | A1 | 8/2007 | Ametsitsi |
| 2010/0278060 | A1 | 11/2010 | Lee et al. |
| 2012/0184213 | A1 | 7/2012 | Onozawa |
| 2013/0128770 | A1 | 5/2013 | Hansen et al. |
| 2017/0236351 | A1 | 8/2017 | Menard et al. |
| 2019/0098499 | A1* | 3/2019 | Lerch .......... G06Q 20/227 |
| 2020/0336303 | A1* | 10/2020 | Sierra .......... H04W 12/12 |

FOREIGN PATENT DOCUMENTS

| | | |
|---|---|---|
| KR | 2019-0105776 | 9/2019 |
| WO | 2013/004754 | 1/2013 |

OTHER PUBLICATIONS

Mokole et al. "Introduction to Ultrawideband Theory/Technology/Systems", 2016 International Conference on Electromagnetics in Advanced Applications, IEEE, Sep. 19, 2016 (Sep. 19, 2016), pp. 768-771.

Zin et al., "A Review of UWB MAC Protocols", 2010 Sixth Advanced International Conference on Telecommunications, May 9, 2010 (May 9, 2010), pp. 526-534.

International Search Report dated Dec. 20, 2019 in counterpart International Patent Application No. PCT/KR2019/011146.

Samsung, "Inclusion of UWB Secure Service Information Element," IEEE 802, 15-18-0458-00-004z, Sep. 12, 2018, Slides 1-8.

Extended European Search Report for EP Application No. 21195846.7 dated Jan. 4, 2022, 10 pages.

* cited by examiner

METHOD FOR UWB TRANSACTION AND ELECTRONIC DEVICE THEREFOR

CROSS-REFERENCE TO RELATED APPLICATIONS

This application is based on and claims priority under 35 U.S.C. § 119 to Korean Patent Application number 10-2018-0107359, filed on Sep. 7, 2018, Korean Patent Application number 10-2018-0167912, filed on Dec. 21, 2018, Korean Patent Application number 10-2019-0081494, filed on Jul. 5, 2019, and Korean Patent Application number 10-2019-0091278, filed on Jul. 26, 2019, in the Korean Intellectual Property Office, the disclosures of which are incorporated by reference herein in their entireties.

BACKGROUND

1. Field

The disclosure relates to a method for an ultra-wideband (UWB) transaction and an electronic device therefor.

2. Description of Related Art

An electronic device may perform a transaction based on Near Field Communication (NFC). For example, a user may obtain an active keyless entry (AKE) by tagging an electronic device having an NFC function at a distance close to an NFC reader (e.g., about 10 cm or less). For example, the electronic device may obtain 'AKE' using an applet stored in a secure element (SE) of the electronic device. When the applet may act as a key for a vehicle or security gate, the user may obtain an AKE for the vehicle or security gate by tapping or tagging the electronic device at the NFC reader.

In the case of a passive keyless entry (PKE), a user may perform payment using an electronic device in a bag or the like of the user without operation such as tagging. For example, when the electronic device is positioned adjacent to an external electronic device (e.g., a reader) at a specified distance from the external electronic device, the external electronic device may be triggered to make communication with the electronic device. For example, in the case of the PKE, the user may unlock the vehicle or the security gate by merely making the electronic device close to the vehicle or the security gate.

The above information is presented as background information only to assist with an understanding of the disclosure. No determination has been made, and no assertion is made, as to whether any of the above might be applicable as prior art with regard to the disclosure.

In the case of NFC transaction, a user has to perform a specified operation to obtain the AKE. For example, the user may need to perform tapping or tagging the electronic device at the NFC reader to obtain the AKE. For another example, the user may need to execute an application for NFC payment to obtain the AKE.

For the NFC transaction, the user has to match a position of an NFC antenna of an electronic device with a position of an NFC antenna of the reader. In general, the NFC antenna is not exposed to the outside, so the user has a difficulty in performing the matching of the NFC antenna. For another example, the NFC transaction may be weak to a relay attack. For another example, when the payment is performed through the NFC transaction, the user has to make the electronic device close to a point of sales (POS) terminal to perform payment in the state that the user does not recognize an exact amount of money.

SUMMARY

Embodiments of the disclosure address at least the above-mentioned problems and/or disadvantages and to provide at least the advantages described below. Accordingly, an example aspect of the disclosure is to provide MB transaction methods capable of ensuring security and expanding the experience of a user.

In accordance with an example aspect of the disclosure, an electronic device may include communication circuitry configured to perform short-range wireless communication, ultra-wideband (UWB) communication circuitry configured to perform UWB communication, a secure element comprising secure data storage configured to provide an execution environment isolated from an operating system (OS) of the electronic device, and a processor operatively connected with the communication circuitry, the UWB communication circuitry, and the secure element. The UWB communication circuitry is configured to perform ranging with an external electronic device, to receive a first UWB signal including a medium access control (MAC) header and a MAC payload from the external electronic device, and to determine, based at least on MAC payload information included in the MAC payload, whether to forward (e.g., transmit or deliver) information included in the MAC payload information to the secure element.

In accordance with another example aspect of the disclosure, an electronic device may include communication circuitry configured to perform short-range wireless communication, ultra-wideband (UWB) communication circuitry configured to perform UWB communication, and a processor operatively connected with the communication circuitry and the UWB communication circuitry. The UWB communication circuitry may be configured to perform ranging with an external electronic device using a UWB signal, to determine whether the external electronic device is positioned within a specified distance from the electronic device based on the ranging, and to transmit a first UWB signal including medium access control (MAC) payload information specified to request a UWB transaction to the external electronic device based on the external electronic device being positioned within the specified distance.

In accordance with another example aspect of the disclosure, a method for ultra-wideband (UWB) transaction of an electronic device may include performing ranging with an external electronic device using a UWB signal, receiving a first UWB signal including a medium access control (MAC) header and a MAC payload from the external electronic device based on the ranging, and forwarding, based at least on medium access control (MAC) payload information included in the MAC payload, information included in the MAC payload information to a processor of the electronic device or a secure element of the electronic device isolated from the processor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description taken in conjunction with the accompanying drawings, in which.

In the following description made with respect to the accompanying drawings, similar components will be assigned with similar reference numerals.

DETAILED DESCRIPTION

Various embodiments in the disclosure may be described with reference to accompanying drawings. Accordingly, those of ordinary skill in the art should understand that embodiments and the terminology used in the disclosure are not limited to specific embodiments, but various modifications, equivalents, and/or alternatives of the embodiments can be made without departing from the technical spirit of the disclosure.

Figure 1:
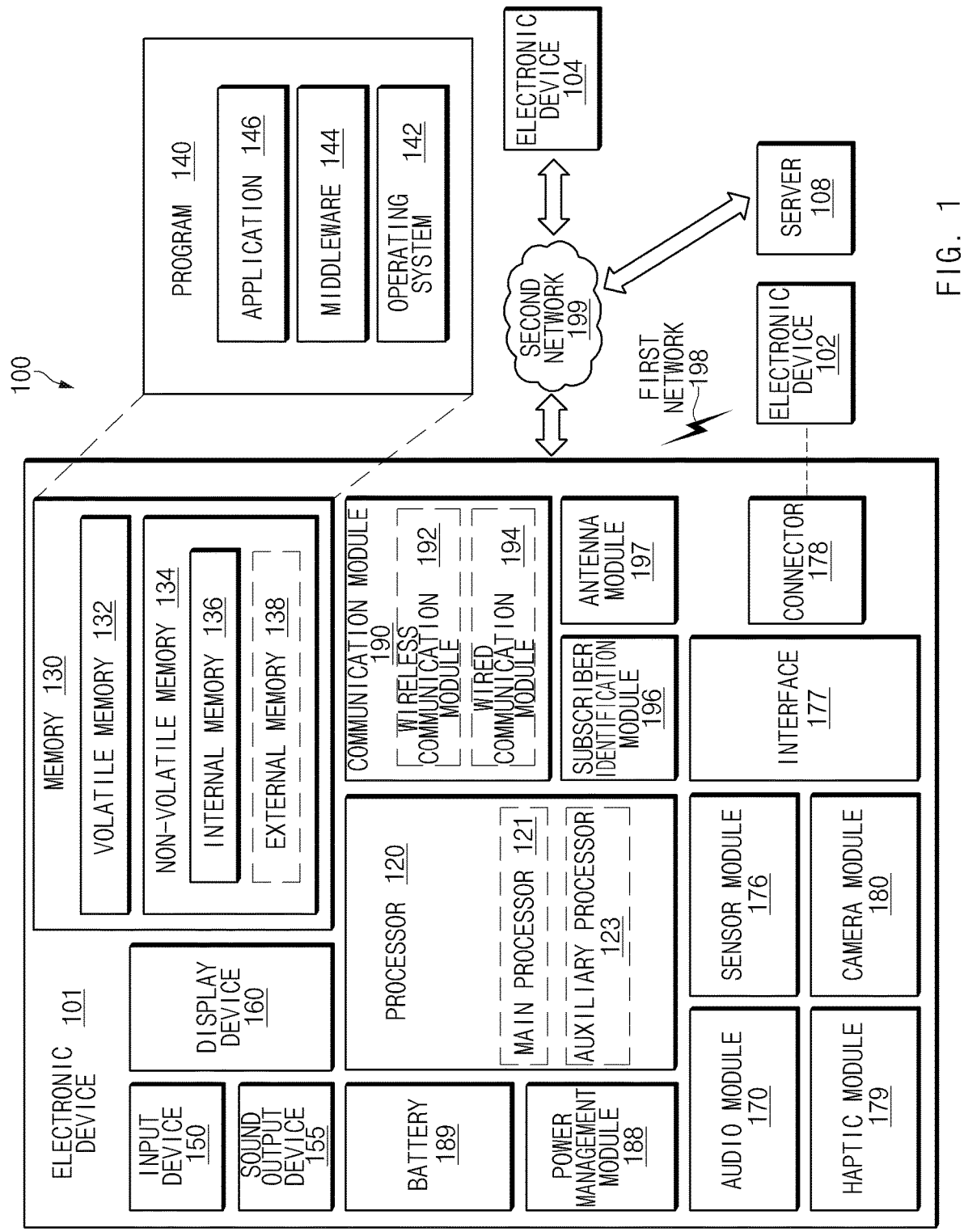
FIG. 1 is a block diagram illustrating an example electronic device in a network, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, an electronic device 101 may include at least some of components of the electronic device 101 illustrated in FIG. 1. According to an embodiment, the electronic device 101 may include the communication module 190, the processor 120 operatively connected with the communication module 190, and the memory 130 operatively connected with the processor 120. For example, the memory 130 may store instructions that when executed, cause the processor 120 to perform the operations of the electronic device 101 to be described below. According to an embodiment, the electronic device 101 may further include components illustrated in FIG. 1. For example, the electronic device 101 may further include a housing to receive at least some of components of the electronic device 101.

Figure 2:
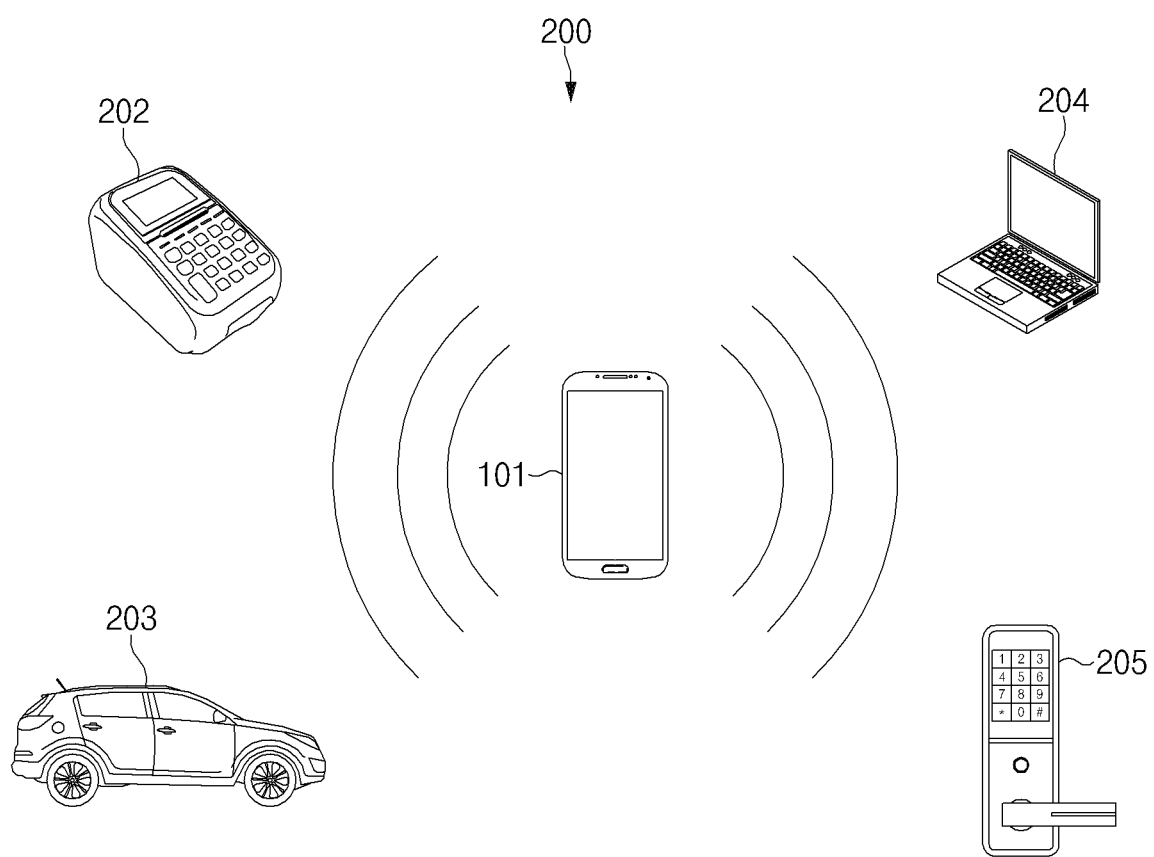
FIG. 2 is a diagram illustrating an example communication environment of an electronic device, according to various embodiments.

FIG. 2 is a diagram illustrating an example communication environment 200 of the electronic device 101, according to various embodiments.

According to various embodiments, the electronic device 101 may measure (e.g., determine) the distance (e.g., distance, as used herein may include, for example, and without limitation an approximate, e.g., within a specified distance or range, or a relative distance) from another electronic device based on a UWB signal. For example, and without limitation, the UWB signal may be a signal having a frequency band of 500 MHz or more. For another example, the UWB signal may, for example, and without limitation, be a signal having a bandwidth, the size of which corresponds to about 20% or more of the central frequency of the UWB signal. However, it will be understood that the disclosure is not limited thereto. The electronic device 101 may perform ranging with an external electronic device using the UWB signal, because the UWB signal has the characteristic similar to the characteristic of an impulse signal on a time domain. For example, the ranging may include measuring the distance between the electronic device 101 and the external electronic device. For example, the electronic device 101 may receive the UWB signal from the external electronic device and measure the distance between the electronic device 101 and the external electronic device using time information (e.g., time stamp information) of the received UWB signal.

According to various embodiments, the electronic device 101 may perform communication with other external electronic devices based on the UWB signal. For example, the communication based on the UWB signal may be referred to as UWB communication. According to an embodiment, the electronic device 101 may perform a UWB transaction using the UWB signal. The electronic device 101 may use the UWB transaction for various applications (or applets) running on the electronic device 101.

According to various embodiments, the electronic device 101 may provide a payment service using the UWB transaction. According to an embodiment, the electronic device 101 may be configured to execute an application for the payment service, when receiving a UWB signal including specified information from, for example, a POS terminal 202. For example, the POS terminal 202 may transmit a UWB signal including information associated with payment, when it is determined that the electronic device 101 is positioned at or within a specified distance. For another example, the electronic device 101 may transmit a UWB signal for requesting the transmission of the information associated with the payment, when it is determined the POS terminal 202 is positioned at the specified distance from the electronic device 101 based on the UWB signal. The POS terminal 202 may transmit the UWB signal including the information associated with the payment, when the request for the information associated with the payment is received.

According to an embodiment, the electronic device 101 may execute an application for payment, which is stored in the electronic device 101, using the received information associated with payment. For example, the electronic device 101 may execute a specified application for a payment service when receiving a UWB signal including specified information from the POS terminal 202. Accordingly, the user may perform payment based on the UWB signal without tagging or tapping the electronic device 101 at the POS terminal 202. In addition, the user may be provided with a payment service safe from the relay attack, because distance measuring based on the UWB signal is used.

According to an embodiment, the electronic device 101 may provide at least a portion of the received information associated with the payment for the user. For example, the electronic device 101 may provide, for the user, payment information based on the information included in the UWB signal received from the POS terminal 202. For example, the payment information may include distance information (e.g., the distance between the electronic device 101 and the POS terminal 202). For example, the payment information may further include additional information such as a purchase amount, the information (e.g., a business name) of the POS terminal 202, and/or product information. The user may allow the payment after identifying the payment information, so the user may be provided with the payment service ensured in safety.

According to an embodiment, the electronic device 101 may obtain a keyless entry using a UWB transaction. For example, when receiving a UWB signal including specified information from a vehicle 203, the electronic device 101 may transmit information (e.g., authentication information) for the keyless entry to the vehicle 203, thereby unlocking the vehicle 203. According to an embodiment, when it is determined that the electronic device 101 is positioned at or within a specified distance, the vehicle 203 may transmit a UWB signal including information for requesting authentication. The electronic device 101 may provide, for the user, a notification of requesting the authentication, or may transmit a UWB signal including authentication information to the vehicle 203 without the allowance of the user, depending on the settings of the electronic device 101. According to an embodiment, when it is determined that the vehicle 203 is positioned at or within the specified distance based on the UWB signal, the electronic device 101 may provide, for the user, the notification for requesting the authentication or may transmit the UWB signal including authentication information to the vehicle 203 without the allowance of the user, depending on the settings of the electronic device 101. Accordingly, the user may obtain the keyless entry for the vehicle 203 without the operation of the electronic device 101 for the keyless entry. In this case, the keyless entry safe from the relay attack may be provided for the user, because the distance measuring based on the UWB signal is used. Similarly, the electronic device 101 may obtain the keyless entry for a laptop 204 and/or a door lock 205 based on the UWB signal. The keyless entry is provided only for illustrative purposes, and the operations of the vehicle 203 and the electronic device 101 based on the UWB transaction in the disclosure are not limited thereto. According to an embodiment, the vehicle 203 and/or the electronic device 101 may be set to perform various operations based on the distance between the electronic device 101 and the vehicle 203. For example, the vehicle 203 may determine whether the electronic device 101 is present inside or outside the vehicle 203, based on the UWB signal. When the electronic device 101 is present inside the vehicle 203, the vehicle 203 may be set to perform a first operation. When the electronic device 101 is present outside the vehicle 203, the vehicle 203 may be set to perform a second operation different from the first operation.

The applications based on the UWB transaction described with reference to FIG. 2 are provided only for illustrative purposes, and the embodiments in the disclosure are not limited thereto. For example, the electronic device 101 may use the UWB transaction for various applications, such as a proximity-based commercial, based on proximity, in addition to the payment and/or the keyless entry.

Figure 3:
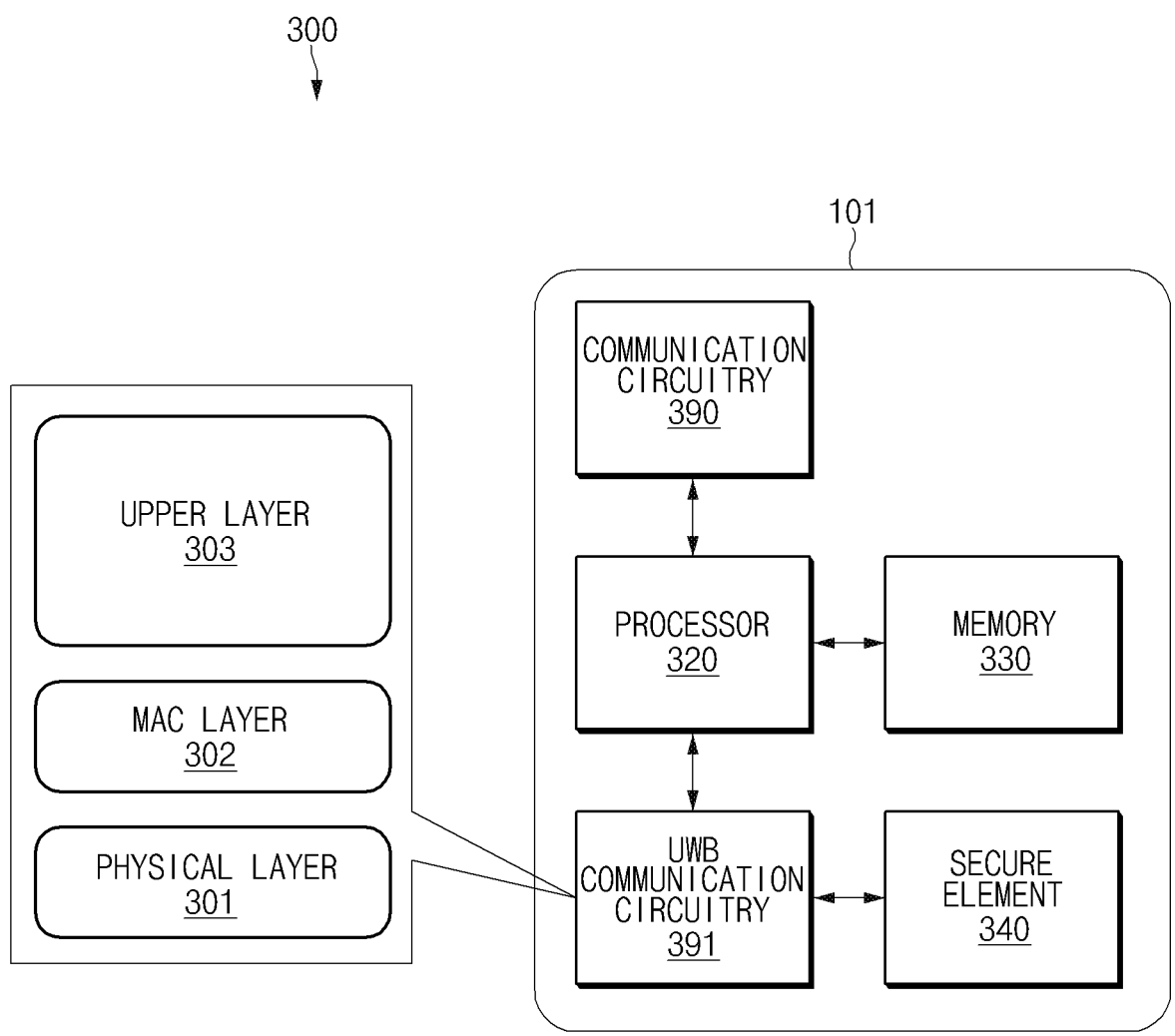
FIG. 3 is a block diagram illustrating an example electronic device, according to various embodiments.

FIG. 3 is a a block diagram 300 illustrating an example electronic device 101, according to various embodiments.

According to various embodiments, the electronic device 101 may include a processor (e.g., including processing circuitry) 320 (e.g., the processor 120 of FIG. 1), a memory 330 (e.g., the memory 130 of FIG. 1), a secure element (SE) (e.g., including secure data storage) 340, communication circuitry 390 (e.g., the communication module 190 of FIG. 1), and UWB communication circuitry 391. For example, the processor 320 may be operatively connected with the memory 330, the communication circuitry 390, and the UWB communication circuitry 391. The memory 330 may store instructions that, when executed by the processor 320, cause the electronic device 101 to perform various operations. The processor 320 may communicate with the secure element 340 through a trusted execution environment (TEE) of the processor 320. For example, the TEE may be used for processing information requiring higher security such as, for example, and without limitation, Digital Rights Management (DRM), a financial service, and/or authentication, etc. In addition, the TEE may be an execution environment driven in parallel to an operating system (OS).

According to various embodiments, the secure element 340 may be a component including, for example, and without limitation, a secure data storage, to provide security to the electronic device 101. For example, the secure element 340 may be isolated from the OS of the electronic device 101. The secure element 340 may be accessed only through a program (e.g., an application and/or applet) which is allowed. The secure element 340 may execute a specified security application (e.g., a payment application) and may store information sensitive to security. For example, the secure element 340 may be implemented in the form of a chip separate from the processor 320. According to an embodiment, the secure element 340 may be a secure element (eSE) embedded in the electronic device 101.

According to various embodiments, the communication circuitry 390 may communicate with the external electronic device in compliance with various communication standards. For example, the communication circuitry 390 may be referred to as a communication module to perform communication in compliance with communication standards other than a UWB communication standard. For example, the communication circuitry 390 may perform Bluetooth (BT) communication, Bluetooth low energy (BLE) communication, wireless fidelity (Wi-Fi) communication, neighbor awareness networking (NAN) communication, cellular communication, and/or infrared communication, but the disclosure is not limited thereto.

According to various embodiments, the UWB communication circuitry 391 may control UWB communication. For example, the UWB communication circuitry 391 may transmit or receive a UWB signal. According to an embodiment, the UWB communication circuitry 391 may process the UWB signal at a plurality of layers. For example, the UWB communication circuitry 391 may process data at a physical layer 301, a medium access control (MAC) layer 302, and an upper layer 303. For example, the upper layer 303 may include a network layer, a security layer, an application framework layer, and/or an application layer.

According to various embodiments, the UWB communication circuitry 391 may transmit data, which is received from an external electronic device (e.g., the electronic device 102 of FIG. 1) to the processor 320 (e.g., the OS run by the processor 320 or the application on the OS) or the secure element 340 (e.g., an application on the secure element 340), based on information stored at the upper layer 303. According to an embodiment, the UWB communication circuitry 391 may route data to the processor 320 or the secure element 340, based on specified information of data. For example, the processor 320 or the secure element 340 may perform a specified operation using the information of the received data. For example, the processor 320 or the secure element 340 may execute an application or provide an application selection user interface (UI) to process the received data.

According to an embodiment, the UWB communication circuitry 391 may route the data received from the external electronic device using information (e.g., MAC information element (IE)), which is included at the MAC layer 302, of the received UWB signal and the information stored at the upper layer 303. For example, the upper layer 303 may store a routing table or mapping information to route data.

According to an embodiment, the UWB communication circuitry 391 may communicate with the secure element 340 through an inter-integrated chip (I2C) bus. The UWB communication circuitry 391 may communicate with the processor 320 through a serial peripheral interface (SPI).

Figure 4:
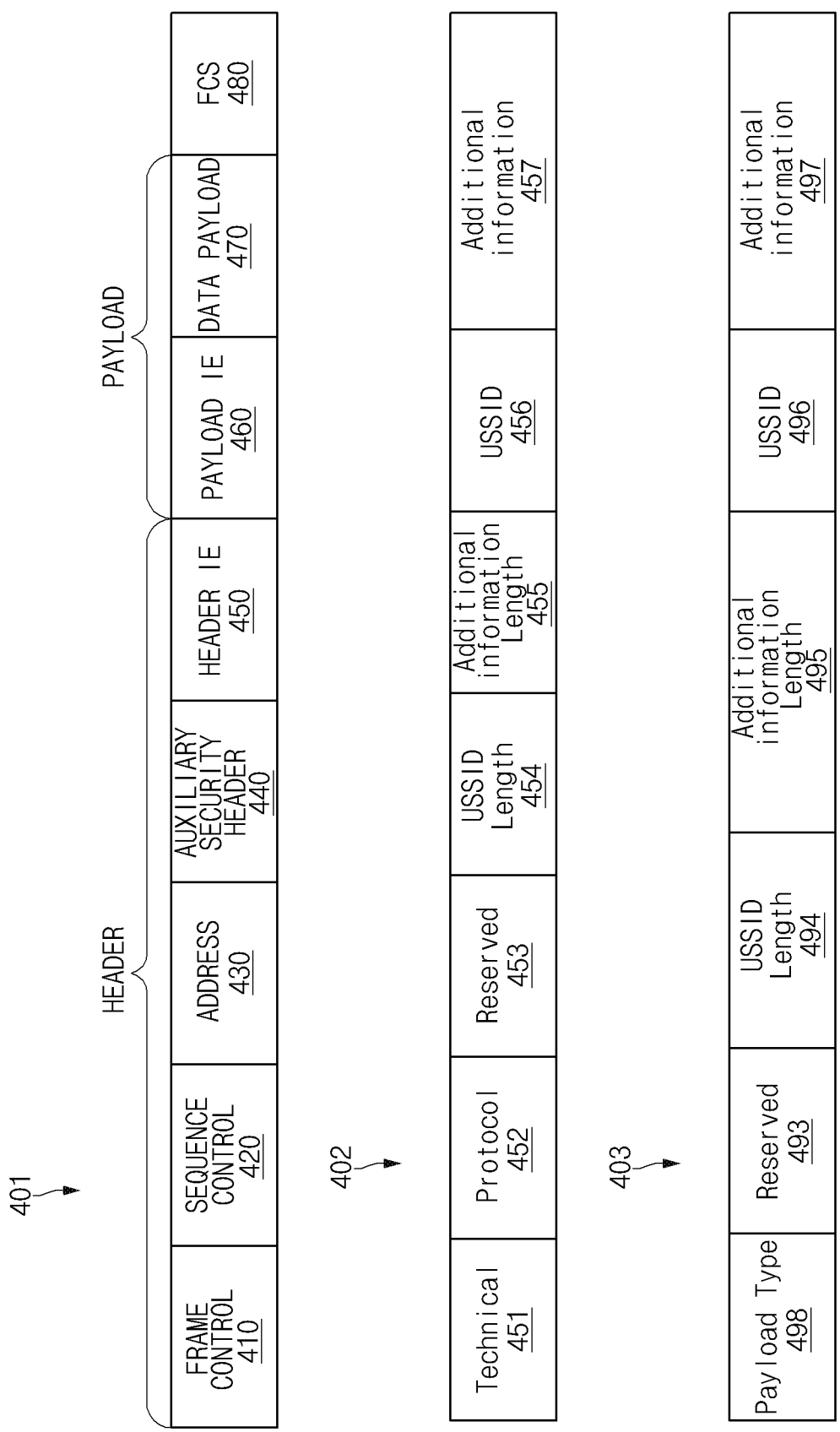
FIG. 4 is a diagram illustrating the structure of a MAC frame and a USS IE, according to various embodiments.

FIG. 4 is a diagram illustrating the structure of a MAC frame 401 and a USS IE 402 or 403, according to various embodiments.

According to various embodiments, the electronic device 101 (e.g., the UWB communication circuitry 391) may use the format of the MAC frame 401 based on Institute of Electrical and Electronics Engineering (IEEE) 802.15.4 and associated standards. For example, the MAC frame 401 may include a header and a payload. A Payload IE 460 of the MAC frame 401 may include at least one IE. For example, the Payload IE 460 may include the USS IE 402 or 403.

According to an embodiment, the MAC header may include a Frame Control 410, a Sequence Control 420, an Address 430, an Auxiliary Security Header 440, and a Header IE 450. For example, the Frame Control 410 may have the length of one byte or two bytes. The Frame Control 410 may include frame type information, frame version information, security enable information, pending frame information, acknowledgment (ACK) request information, sequence number suppression information, IE present information, destination address mode information, and/or source address mode information. For example, the Sequence Control 420 may have the length of one byte or two bytes. The Sequence Control 420 may include sequence identifier (ID) information of the MAC frame 401. For example, the Address 430 may include network group information, destination address information, and/or source address information. For example, the Auxiliary Security Header 440 may include information required for security processing. For example, the Header IE 450 may include various pieces of information and may be omitted. The Header IE 450 may include an IE indicating the end point of the header.

According to an embodiment, the payload may include the Payload IE 460 and a Data Payload 470. For example, the Payload IE 460 may include at least one IE and may include an IE indicating the end point of the Payload IE 460. For example, the Data Payload 470 may include information specified depending on the individual frame type.

According to an embodiment, a Frame Check Sequence (FCS) 480 may include information for identifying the integrity of the MAC frame 401 (e.g., cyclic redundancy check (CRC)).

According to various embodiments, the Payload IE 460 may contain an IE including information for routing data contained in the UWB signal. For example, the IE including the information for routing may be referred to as a USS (UWB secure service) IE 402 or 403. According to an embodiment, the USS IE 402 or 403 may have a nested IE format having a MAC sublayer management entity (MLME) group ID. Hereinafter, the structure of various USS IEs 402 or 403 will be described with reference to FIG. 4. Hereinafter, the first USS IE 402 and the second USS IE 403 are distinguished from each other for the convenience of explanation, but both the first USS IE 402 and the second USS IE 403 may be referred to as the USS IE 402 or 403 in the disclosure.

According to an embodiment, the first USS IE 402 may include at least a Technical 451, a Protocol 452, a Reserved 453, a USS Identifier (USSID) Length 454, an Additional Information Length 455, a USSID 456, and/or an Additional Information 457.

For example, the Technical 451 may indicate an NFC type corresponding to a security service (e.g., a UWB transaction) corresponding to a USSID. For example, the Technical 451 may indicate NFC signaling type A (e.g., international organization for standardization (ISO)/international electrotechnical commission (IEC) 14443A based signaling), NFC signaling type B (e.g. ISO/IEC 14443B based signaling) or an NFC signaling type F (e.g., FeliCA JIS X6319-4 based signaling). The Technical 451 may have a length of, for example, two bits. For example, in the value of the Technical 451, "00" may indicate NFC signaling type A, "01" may indicate NFC signaling type B, and "10" may indicate NFC signaling type F. In addition, the value, "11", of the Technical 451 may be a reserved value.

For example, the Protocol 452 may include NFC communication protocol information associated with UWB transaction. For example, the Protocol 452 may indicate a data exchange protocol (ISO-DEP), MIFARE, or FELICA. The Protocol 452 may have the length of, for example, two bits. For example, in the value of the Protocol 452, "00", "01", and "10" may indicate ISO-DEP, MIFARE, and FELICA, respectively. The value, "11" of the Protocol 452 may be a reserved value.

For example, the Reserved 453 may have the length of four bits.

For example, the USSID Length 454, which is a field having the length of four bits, may include information for indicating the number of bytes of the USSID 456.

For example, the Additional Information Length 455, which is a field having the length of four bits, may include information for indicating the number of bytes of the Additional Information 457.

For example, the USSID 456 may have the length of 1 to 16 bytes. For example, the USSID 456 may include information for identifying a service associated with the UWB transaction. The USSID 456 may include an ID for identifying a UWB security service, an application identifier (AID), or a system code. For example, the ID may be positioned at the first byte of the USSID 456 when the AID or the system code is not used. For example, the value, "0X01" of the ID may indicate MIFARE Classic, the value, "0x02" of the ID may indicate MIFARE Desfire, the value, "0X03" of the ID may indicate Implicit Select. For example, the system code may be used to distinguish between services when the type of the Technical 451 is NFC signaling type F. The system code may occupy two bytes (e.g., the second byte and the third byte) of the USSID 456. For example, the value, "0X8008" of the system code may indicate Octopus service. For example, the AID may indicate AID defined by ISO 7816-4. The AID may have the length ranging from 4 bytes to 16 bytes. The AID may indicate ID information of an application associated with the UWB transaction.

For example, the Additional Information 457 may include additional information associated with the UWB transaction. For example, the additional information may include information on an amount to be paid or information on a transaction target (e.g., a vehicle name, information on a security gate location, and/or information associated with a UWB reader), and/or information on an article (e.g., a transaction target article) associated with transaction. The Additional Information 457, which may have the length of up to 16 bytes, may be omitted. According to an embodiment, the electronic device 101 may provide, for a user, information associated with the UWB transaction (e.g., UWB security service) using the Additional Information 457.

The electronic device 101 (e.g., the UWB communication circuitry 391) may detect the first USS IE 402 at the MAC layer 302, when the received UWB signal contains the first USS IE 402, by making reference to the first USS IE 402 of FIGS. 3 and 4. When the first USS IE 402 is detected, the electronic device 101 may determine to forward (e.g., transmit or deliver) the first USS IE 402 to one of the processor 320 or the secure element 340 using a routing table (e.g., mapping information), stored at the upper layer 303.

According to an embodiment, the routing table may include information on each first USS IE 402 and permission state information for the each first USS IE 402. The routing table may include, with respect to an USSID, information on a protocol (e.g., NFC protocol) used by the USSID, and mapping information indicating the access authority information of the secure element 340 with respect to the USSID. For example, the routing table may store NFC type information (e.g., information on the Technical 451), protocol information (e.g., information on the Protocol 452), and the USSID 456 of the first USS IE 402, as information on the first USS IE 402. For example, the routing table may include, as the permission state information, information for indicating a present state of the permission for the first USS IE 402. For example, the state of the permission may indicate "Always Allow", "Allow in This Session", "Undecided", or "Deny or Not-Allowed".

According to an embodiment, the state "Always Allow" may refer to that the first USS IE 402 of a relevant USSID may be always routed to the secure element 340. For example, the state "Always Allow" may be permitted with respect to the UWB transaction for the keyless entry. For another example, the state "Always Allow" is not permitted to the USSID associated with the payment. For another example, the state "Always Allow" may be permitted in default for remaining security services other than payment.

According to an embodiment, the state "Allow in This Session" may refer to the authority on the access to the secure element 340 effective only to one session after the authentication (e.g., the input of a password or the authentication of bio-information (e.g., the fingerprint and/or iris)) of the user. For example, the state "Allow in This Session" may be permitted with respect to the UWB transaction for payment.

According to an embodiment, the state "Undecided" may refer to the state of a UWB security service which is not allowed by the user. For example, the state of the permission for the payment service may be indicated as the state "Undecided" before the authentication of the user, and may be indicated as the state "Allow in This session" after the authentication of the user. When the UWB security service in the state "Undecided" is received, the electronic device 101 may be set to ask a user whether the relevant UWB security service is allowed. For another example, the state "Undecided" may be a default option for the payment service. For another example, the electronic device 101 may process the UWB security service, which is not present in the routing table, as being in the same state as the state "Undecided".

According to an embodiment, the state "Deny or Not-Allowed" may refer to the state that the access to the secure element 340 is not allowed with respect to the relevant UWB security service. For example, the user may specify the state "Deny or Not-Allowed" for a specific UWB security service. For another example, the specific UWB security service may be specified as being in the state "Deny or Not-Allowed" by a manufacturer or a service provider. For another example, the specific UWB security service may be specified as being in the state "Deny or Not-Allowed" based on a specified security criterion.

The structure of the first USS IE 402, which is illustrated in FIG. 4, is provided for illustrative purposes, and embodiments in the disclosure are not limited thereto. A USS IE may have the structure different from the structure of the first USS IE 402. For example, the USS IE may have the structure the same as the structure of the second USS IE 403.

The second USS IE 403 may have the format of a nested IE having a MAC sublayer management entity (MLME) group ID.

According to an embodiment, the second USS IE 403 may include at least a Payload Type 498, a Reserved 493, an USSID Length 494, an Additional Information Length 495, an USSID 496, and/or an Additional Information 497.

For example, the Payload Type 498 may indicate the type of content contained in the MAC Payload (e.g., the USSID 496 and/or the Additional Information 497). For example, the meaning based on the value of the Payload Type 498 may be shown as in table 1.

TABLE 1

| The value of Payload Type | Meaning |
| --- | --- |
| 0 | A MAC payload includes an application protocol data unit (APDU) defined by ISO/IEC 7816-4. |
| 1 | A MAC payload includes a Mifare Classic ® command. |
| 2 | A MAC payload includes a Mifare Desfire ® command. |
| 3 | A MAC payload includes information defined by JIS X 6319-4. |
| The others | RESERVED |

For example, the Reserved 493 may have the length of four bits.

For another example, the meaning based on the value of the Payload Type 498 may be shown as in table 2.

TABLE 2

| The value of Payload Type | Meaning |
| --- | --- |
| 0 | MAC Payload contains an APDU as defined by ISO/IEC 7816-4 |
| 1 | MAC Payload contains a Mifare Classic ® command or response. |
| 2 | MAC Payload contains a Mifare Desfire ® command or response. |
| 3 | MAC Payload contains Information as defined by JIS X 6319-4. |
| All other values | RESERVED |

For example, the meaning based on the value of the Payload Type 498 may be shown as in table 3.

TABLE 3

| The value of Payload Type | Meaning |
| --- | --- |
| 0 | Application specific payload |
| 1 | MAC Payload contains an APDU as defined by ISO/IEC 7816-4 |
| 2 | MAC Payload contains a Mifare Classic ® command or response. |
| 3 | MAC Payload contains a Mifare Desfire ® command or response. |
| 4 | MAC Payload contains Information as defined by JIS X 6319-4. |
| All other values | RESERVED |

For example, the USSID Length 494, which is a field having the length of five bits, may include information for indicating the number of bytes of the USSID 496. For example, when the value of the USSID length 494 is "0", the USSID Length 494 may indicate "implicit select". For example, when the value of the USSID Length 494 is 16 or more, the value of the USSID length may be a reserved value.

For example, the Additional Information Length 495, which is a field having the length of five bits, may include information for indicating the number of bytes of the Additional Information 497. When the value of the Additional Information Length 495 is "0", the second USS IE 403 may not include the Additional Information 497. For example, the Additional Information 497 may be omitted from the second USS IE 403. The Additional Information Length 495 may have the value between "0" and "31".

According to various embodiments, the USSID 496 and the Additional Information 497 may provide information on the transaction. For example, the information on the transaction may include user information and information used for authentication.

According to various embodiments, the USSID 496 may include an application identifier (AID) or a system code. For example, the USSID 496 may have the length of 0 to 16 bytes. According to an embodiment, the USSID 496 may be positioned at the first frame used for the transaction. The USSID 496 may be contained in the second USS IE 403 whenever a target AID or a system code is changed.

According to an embodiment, the USSID 496 may include information for identification of a service (e.g., an application) associated with a UWB transaction. For example, when the USSID 496 includes an AID, the AID may indicate an identifier (e.g., an identifier having a length of 5 bytes to 16 bytes) corresponding to the application associated with the transaction. In this case, the AID may include an application identifier defined by ISO/IEC 7816-4. The USSID 496 may include an AID only when the value of the Payload Type 498 is "0".

According to an embodiment, when the USSID 496 includes the system code, the system code may include a system code defined by JIS X 6319-4DP. For example, the USSID 496 may include the system code only when the value of the Payload Type 498 is 3.

According to various embodiments, the Additional Information 497 may include information on character string. For example, the Additional Information 497 may include additional information associated with the UWB transaction. For example, the additional information may include information on an amount to be paid or information on a transaction target (e.g., a vehicle name, information on a security gate location, and/or information associated with a UWB reader), and/or information on an article (e.g., a transaction target article) associated with the transaction. According to an embodiment, the characters in the Additional Information 497 may be encoded in a specified format (e.g., a unicode transformation format (UTF)-8). In the character string in the Additional Information 497, a delimiter indicating the change in a line of the character string may be included in the character string. For example, the delimiter value may correspond to a specified value (e.g., a carriage return line feed (CRLF) of UTF-8).

According to an embodiment, the Additional Information 497 may have a length of 0 to 31 bytes, and may be omitted. For example, the Additional Information 497 may always be present in the first frame used in the transaction.

The electronic device 101 (e.g., the UWB communication circuitry 391) may detect the second USS IE 403 at the MAC layer 302, when the received UWB signal contains the second USS IE 403, by making reference to the second USS IE 403 of FIGS. 3 and 4. When the second USS IE 403 is detected, the electronic device 101 may determine to forward (e.g., transmit or deliver) the second USS IE 403 to one of the processor 320 or the secure element 340 using a routing table (e.g., mapping information), which is stored at the upper layer 303.

According to an embodiment, the routing table may include information on each second USS IE 403 and information on the state of the permission for the second USS IE 403. The routing table may include, for example, the permission state information corresponding to at least a portion of the second USS IE 403. For example, the routing table may store the Payload Type 498 and the USSID 496 of the second USS IE 403, as information on the second USS IE 403. For example, the routing table may include, as the permission state information, information indicating a present state of the permission for the second USS IE 403. For example, the state of the permission may indicate "Always Allow", "Allow in This Session", "Undecided", or "Deny or Not-Allowed".

According to an embodiment, the state "Always Allow" may refer to that the second USS IE 403 of the relevant USSID may be always routed to the secure element 340. For example, the state "Always Allow" may be permitted with respect to the UWB transaction for the keyless entry. For another example, the state "Always Allow" is not permitted with respect to the USSID associated with the payment. For another example, the state "Always Allow" may be a default state, with respect to remaining security services other than payment.

According to an embodiment, the state "Allow in This Session" may refer to the authority on the access to the secure element 340 effective only to one session after the authentication (e.g., the input of a password or the authentication of bio-information (e.g., the fingerprint and/or iris) of the user. For example, the state "Allow in This Session" may be permitted with respect to the UWB transaction for payment.

According to an embodiment, the state "Undecided" may refer to the state of the UWB security service which is not allowed by the user. For example, the state of the permission for the payment service may be indicated as the state "Undecided" before the authentication of the user, and may be indicated as the state "Allow in This session" after the authentication of the user. When the UWB security service in the state "Undecided" is received, the electronic device 101 may be set to ask a user whether the relevant UWB security service is allowed. For another example, the state "Undecided" may be a default option for the payment service. For another example, the electronic device 101 may process the UWB security service, which is not present in the routing table, as being in the state "Undecided".

According to an embodiment, the state "Deny or Not-Allowed" may refer to the state that the access to the secure element 340 is not allowed with respect to the UWB security service. For example, the user may specify the state "Deny or Not-Allowed" for a specific UWB security service. For another example, the specific UWB security service may be specified as being in the state "Deny or Not-Allowed" by a manufacturer or a service provider. For another example, the specific UWB security service may be specified as being in the state "Deny or Not-Allowed" based on a specified security criterion.

Referring back to FIG. 2, according to an embodiment, the POS terminal 202 may transmit the USS IE 402 or 403 including the USSID corresponding to the payment service to the electronic device 101 within a specified distance. The electronic device 101 may determine the state of the permission for the UWB security service (e.g., the UWB transaction) corresponding to the sensed USSID and/or the payload type using the routing table, when the USSID and/or the payload type is detected. For example, the state of the permission for the payment service may be the state "Undecided". In this case, the electronic device 101 may provide, for the user, a UI for prompting whether the user allows the payment service. When a user input of allowing the payment service is received, the state of the permission corresponding to the USSID of the payment service is changed to the state "Allow in This session", and then the USS IE 402 or 403 may be transmitted to the secure element 340. For example, the secure element 340 may execute an application for a payment service using an applet installed in the secure element 340. After the session for the payment service is terminated, the electronic device 101 may change the state of the permission corresponding to the USSID and/or the payload type of the payment service to the state "Undecided".

According to an embodiment, the vehicle 203 may transmit the USS IE 402 or 403 including a USSID corresponding to a keyless entry service to the electronic device 101 within a specified distance. The electronic device 101 may identify the state of the permission for the UWB security service (e.g., the UWB transaction) corresponding to the sensed USS IE 402 or 403 (e.g., the USSID and/or payload type) using the routing table when the USS IE 402 or 403 is sensed. For example, the state of the permission for the keyless entry service of the vehicle may be the state "Always Allowed". In this case, the electronic device 101 may transmit the USS IE 402 or 403 to the secure element 340, and the secure element 340 may execute an application for the keyless entry using the applet installed in the secure element 340. For example, the electronic device 101 may unlock the vehicle 203 by transmitting a UWB signal containing information for the keyless entry.

According to various embodiments, the electronic device 101 may manage application information for processing each UWB security service (e.g., UWB transaction). For example, the OS of the electronic device 101 may store UWB security service information associated with each application. For example, when an application supporting the UWB security service is installed, the application may be register the UWB security service information associated with the application in the OS. For example, the UWB security service information may include the name of the application, application-associated image (e.g., banner) information, an application category, a payload type, and/or a USSID (e.g., an identifier, an AID, and/or a system code). For example, the application category may include payment and others.

According to various embodiments, the application information associated with the UWB security service may further include notification method information. For example, the notification method information may indicate a method for providing the notification for the relevant UWB security service. According to an example embodiment, the notification method information may include Vibration, Ring, Off, and/or Pop-Up. For example, when the notification method is set to be "Vibration" or "Ring", the electronic device 101 may provide the notification by providing a vibration or a ring tone together with a pop-up message. For another example, when the notification method is set to be Pop-Up, the electronic device 101 may provide only the pop-up message without providing the vibration and the ring tone. For another example, when the notification method for the application is set to Off, the electronic device 101 may not notify the user of the UWB signal even if the UWB signal including the USSID associated with the application is received. For example, when the UWB transaction is performed or the UWB transaction is attempted, the electronic device 101 may provide a notification depending on the notification method of the application associated with the UWB transaction. A method for providing the notification for the UWB security service by the electronic device 101 may be limited depending on a method for providing a notification, which is set for the electronic device 101.

According to an embodiment, the service associated with the payment may always require the allowance by the user. For example, as for the application associated with the payment, "Off" may not be selected as the notification method information.

According to an embodiment, the user may select the notification method. For example, the electronic device 101 may provide a setting UI for selecting the notification method for the application.

According to an embodiment, the USS IE 402 or 403 may be included in a multiplexed information element (MPX IE) disclosed in IEEE 802.15.9.

Figure 19:
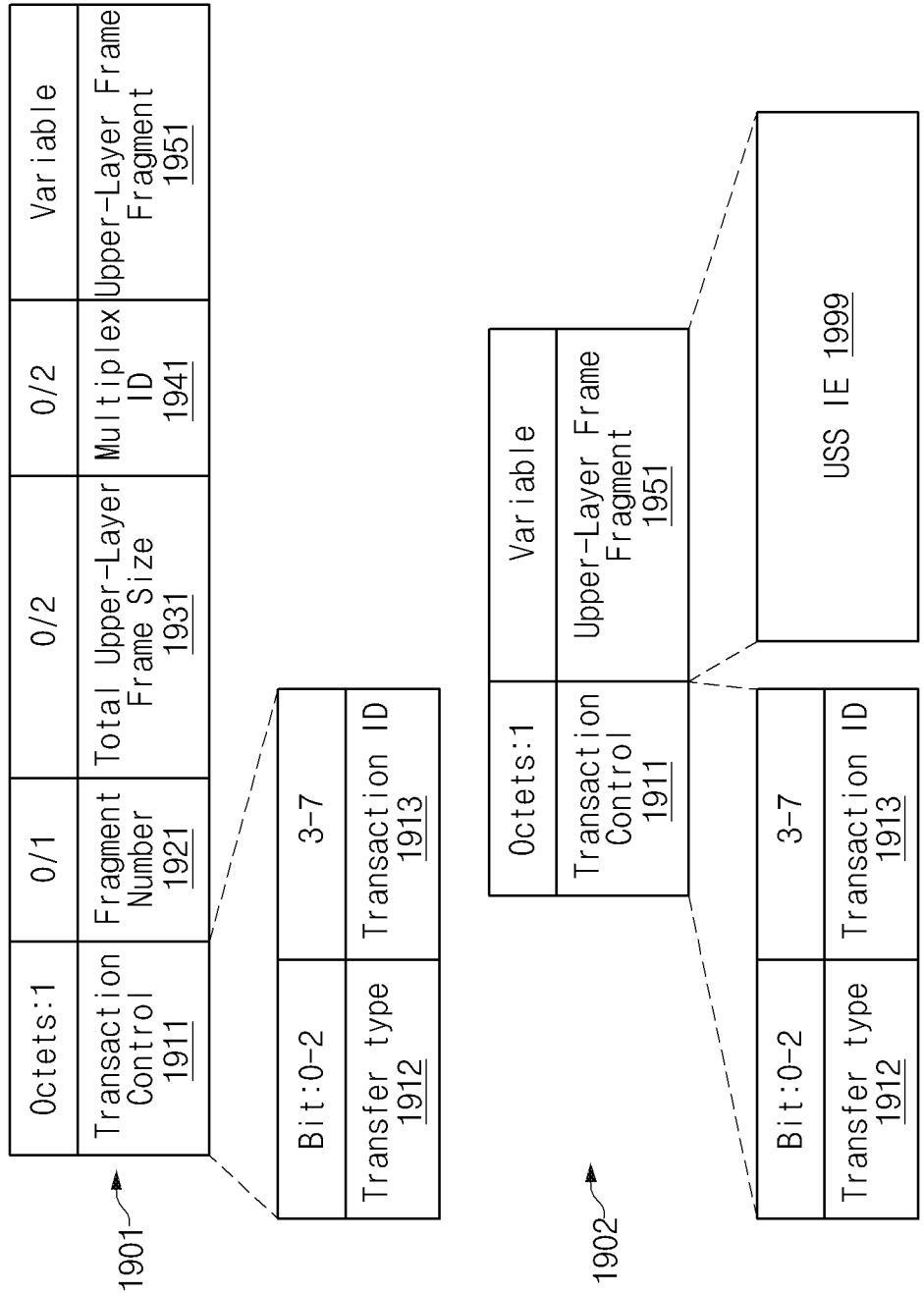
FIG. 19 is a diagram illustrating the structure of an USS IE using multiplexed information element (MAX IE), according to various embodiments.

FIG. 19 is a diagram illustrating the structure of the USS IE based on the MPX IE, according to various embodiments.

A first MPX IE 1901 may have the structure defined in IEEE 802.15.9. For example, the first MPX IE 1901 may be included in a MAC payload (e.g., the payload IE of FIG. 4) and may include Transaction Control 1911, Fragment Number 1921, Total Upper-Layer Frame Size 1931, Multiplex ID 1941, and For example, the Transaction Control 1911 may include fields of Transfer Type 1912 and Transaction ID 1913. The Transfer Type 1912 may indicate the type of the relevant MPX IE and may have the length of three bits. The Transaction ID 1913 may include an intrinsic value used for the relevant transaction and may have the length of five bits.

The Fragment Number 1921 may be used to indicate a fragmented upper layer frame. The Total Upper-Layer Frame Size 1931 may be used to indicate the total size of upper-layer frames. The Multiplex ID 1941 may be used to multiplex mutually different upper-layer protocols.

The Upper-Layer Frame Fragment 1951 may have a variable length. The Upper-Layer Frame Fragment 1951 may include some of frames at the upper layer. The Upper-Layer Frame Fragment 1951 may be empty.

According to various embodiments, the USS IE (see 402 or 403 of FIG. 4) may use the format of the first MPX 1E (1901) described above.

According to an embodiment, the USS IE (see 402 or 403 of FIG. 4) may be included in the Upper-Layer Frame Fragment 1951. For example, the value of the Transfer Type 1912 of the Transaction Control 1911 is set to a specified value (e.g., 0b001), thereby indicating that the Upper-Layer Frame Fragment 1951 includes the USS IE (402 or 403 of FIG. 4).

According to an embodiment, in the case of the MPX IE including the USS IE (see 402 or 403 of FIG. 4), some fields may be omitted from the first MPX IE 1901. For example, the MPX IE including the USS IE (402 or 403 of FIG. 4) may have the same structure as that of a second MPX IE 1902. When the MPX IE includes the USS IE, the value of the Transfer Type 1912 may be set to a specified value (e.g., 0b001). When the MPX IE includes the USS IE (402 or 403 of FIG. 4), the Upper-Layer Fragment may not be used. In this case, as in the second MPX IE 1902, the Fragment Number 1921 and the Total Upper-Layer Frame Size 1931 may be omitted from the first MPX IE 1901. When the value of the Transfer Type 1912 is set to a value other than a previously-set value (e.g., 0b000 or 0b010), the field of the Multiplex ID 1941 is omitted and the information corresponding to the relevant field may be included in the Transaction ID 1913. When the second MPX IE 1902 includes the Transfer Type 1912 having a specified value (e.g., 0b001) indicating that the second MPX IE 1902 includes the USS IE 1999 (e.g., see 402 or 403 of FIG. 4), even the Multiplex ID 1941 may be omitted. Accordingly, the second MPX IE 1902 may include the Transaction Control 1911 and the USS IE 1999 (see 402 or 403 of FIG. 4). The Transfer Type 1912 of the second MPX IE 1902 may be set to a specified value (e.g., 0b001), and the Transaction ID 1913 may include a multiplex ID. For example, the multiplex ID included in the Transaction ID 1913 may be set to a value indicating that the relevant MPX IE or the frame includes information used for security transaction.

Figure 5:
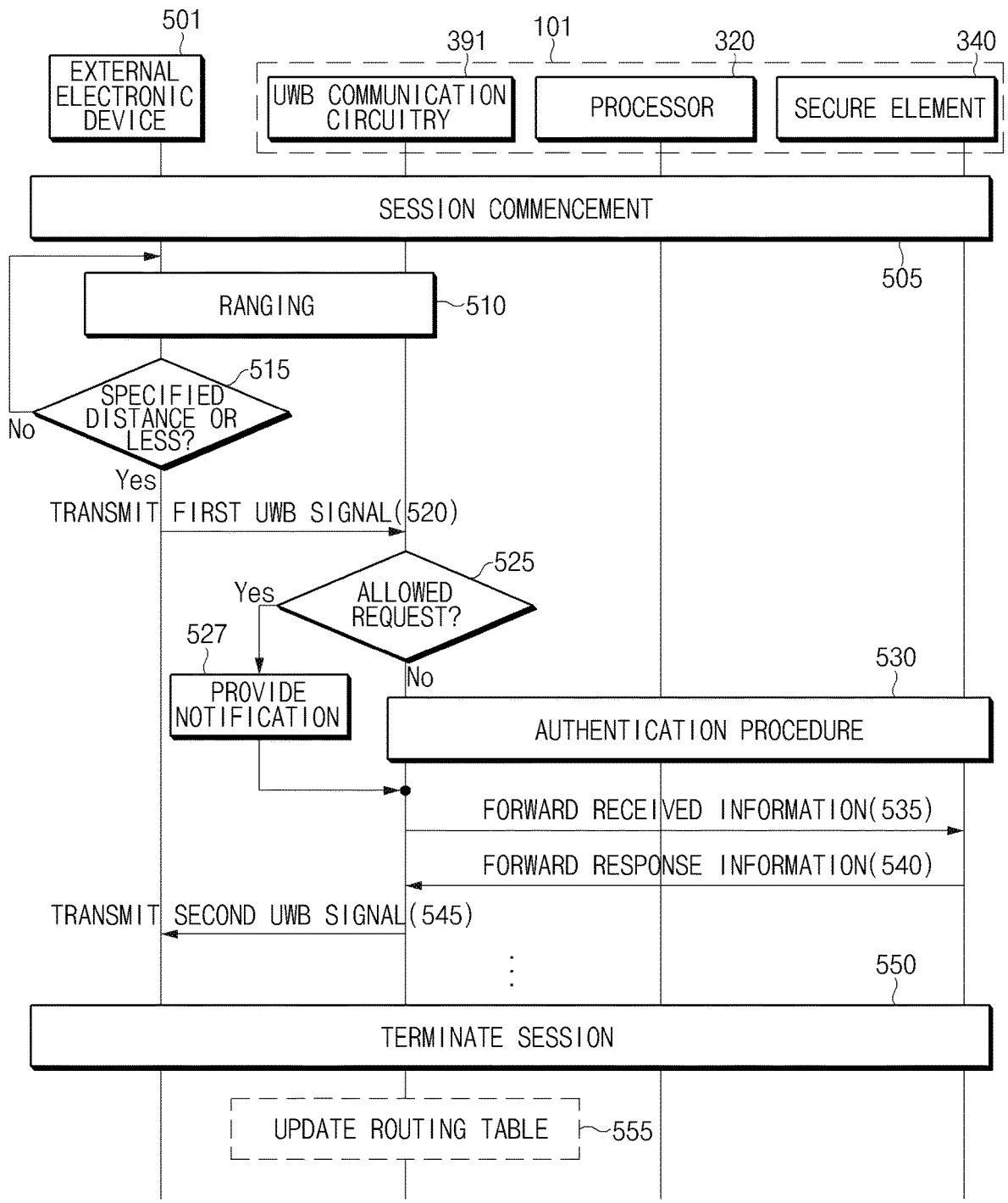
FIG. 5 is a signal flowchart illustrating an example UWB transaction, according to various embodiments.

FIG. 5 is a signal flowchart 500 illustrating an example UWB transaction, according to various embodiments.

1. Payment Service

According to an embodiment, an external electronic device 501 may be a device (e.g., a POS terminal) for payment. FIG. 5 illustrates the flow of a signal for a UWB security service for a payment service in the UWB transaction. However, it will be understood that the disclosure is not limited thereto.

According to various embodiments, in operation 505, the electronic device 101 and the external electronic device 501 commence a session. For example, the session commencement may include the discovery of the electronic device 101 by the external electronic device 501. According to an embodiment, the electronic device 101 and the external electronic device 501 may discover a counterpart device based on UWB communication. The electronic device 101 may commence the session with the external electronic device 501 through the UWB communication circuitry 391. According to an embodiment, the electronic device 101 may commence with the external electronic device 501 using a communication circuitry (e.g., the communication circuitry 390). For example, the electronic device 101 and the external electronic device 501 may discover the counterpart device based, for example, and without limitation, on Bluetooth, BLE, WiFi, and/or NAN, etc. According to an embodiment, when the electronic device 101 discovers the external electronic device 501 through another communication scheme (e.g., Bluetooth, BLE, WiFi, and/or NAN) in addition to UWB communication, the electronic device 101 may activate the UWB communication circuitry 391 after discovering the external electronic device 501. The UWB communication circuitry 391 may include a UWB controller to control the UWB communication. For example, the UWB communication circuitry 391 may further include the UWB controller and other components associated with the UWB communication.

According to various embodiments, in operation 510, the external electronic device 501 and the electronic device 101 may perform ranging. For example, the electronic device 101 and the external electronic device 501 may measure the distance therebetween by transmitting and receiving a UWB signal. According to an embodiment, the external electronic device 501 may measure the distance between the electronic device 101 and the external electronic device 501 by transmitting a UWB signal for ranging to the electronic device 101 and using the time stamp information in the UWB signal received from the electronic device 101. According to an embodiment, the electronic device 101 may determine the distance between the electronic device 101 and the external electronic device 501 by transmitting and receiving the UWB signal using the UWB communication circuitry 391.

In an example embodiment of FIG. 5, although the electronic device 101 performs ranging with the external electronic device 501, the embodiments in the disclosure are not limited thereto. For example, the electronic device 101 may measure the distance to at least one different external electronic device from the electronic device 101 through the ranging.

According to various embodiments, in operation 515, the external electronic device 501 may determine whether the electronic device 101 is present at a specified distance or less (e.g., within a specified distance). For example, the external electronic device 501 may perform the ranging until the electronic device 101 is positioned within the specified distance. For example, the external electronic device 501 may perform the ranging in a specified period.

According to various embodiments, in operation 520, the external electronic device 501 may transmit a first UWB signal. For example, the first UWB signal may include information associated with a payment service. For example, the information associated with the payment service may be included in an MAC payload IE (e.g., the USS IE 402 or 403 or an MPX IE including the USS IE). For example, the information associated with the payment service may include an ID (e.g., the USSID) associated with the payment service. For example, the information associated with the payment service may further include information on an amount to be paid, information on a payment target (e.g., a business name), and/or information of an item to be paid. According to an embodiment, the MAC payload of the first UWB signal may include information for indicating a proximity payment system environment (PPSE).

According to various embodiments, in operation 525, the UWB communication circuitry 391 may determine whether the UWB transaction requested through the first UWB signal is an allowed request. According to an embodiment, the UWB communication circuitry 391 may determine whether the UWB transaction is the allowed request using the routing table (e.g., the mapping information). For example, the UWB communication circuitry 391 may determine whether the requested UWB transaction is the allowed request based on the state of the permission for the payment service of the first UWB signal. The UWB communication circuitry 391 may identify permission information specified to an ID (e.g., USSID) of the payment service from the routing table. For example, when the state of the permission for the requested service is the state "Allow", or "Always Allow", the UWB communication circuitry 391 may provide a notification in response to operation 527. For example, the state of the permission for the payment service may be the state "Undecided". In this case, the UWB communication circuitry 391 may determine the payment service as being a request, which is not allowed, and may perform an authentication procedure. For example, the state of the permission for the payment service is not set to the state "Allow" or "Always Allow", so the UWB communication circuitry 391 may perform the authentication procedure every session. For example, the UWB communication circuitry 391 may perform the authentication procedure by transmitting, to the processor 320, ranging information (e.g., the information on the distance between the electronic device 101 and the external electronic device 501) and information on the MAC payload IE (e.g., the USS IE 402 or 403 or an MPX IE including the USS IE) of the first UWB signal. For example, the UWB communication circuitry 391 may perform the authentication procedure based on the category of the received USSID. For example, when the category of the USSID is a payment category, the UWB communication circuitry 391 may perform the authentication procedure in an authentication method of FIG. 6.

Figure 6:
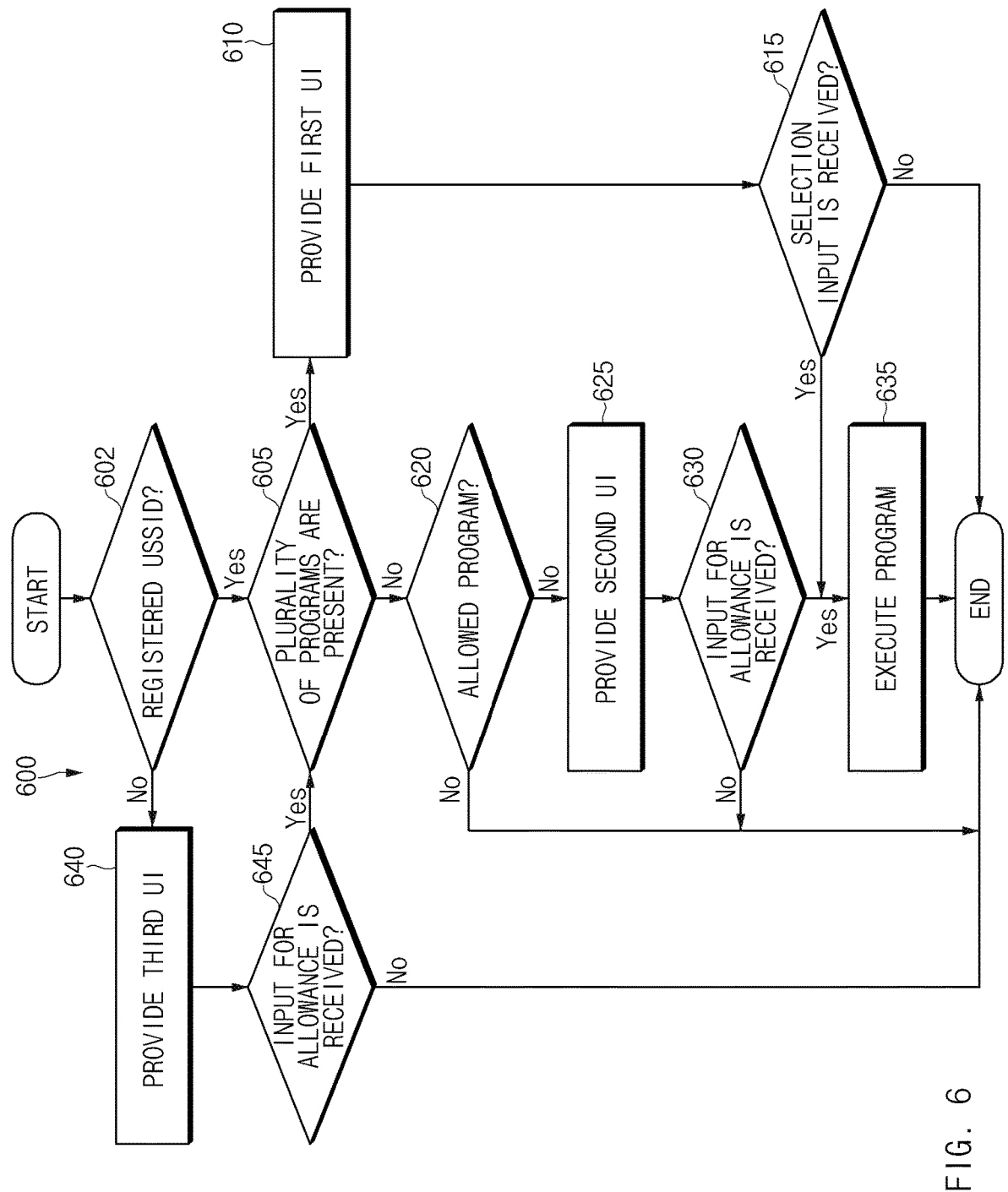
FIG. 6 is a flowchart illustrating an example authentication method according to various embodiments.

FIG. 6 is a flowchart 600 illustrating an example authentication method, according to various embodiments. Hereinafter, an authentication procedure according to various embodiments will be described with reference to FIG. 6. According to various embodiments, the electronic device 101 may perform various authentication procedures based on the category (e.g., payment or others) of the requested UWB transaction. When the USSID of the requested UWB transaction is not registered in the electronic device 101 (e.g., the UWB communication circuitry 391), or when the USSID is registered in all categories as well as the payment category, the electronic device 101 may regard the category of the UWB transaction as the payment service for the security. Hereinafter, the authentication procedure may be described with respect to the payment service.

According to various embodiments, in operation 602, the electronic device 101 may determine whether the USSID associated with the UWB transaction is a USSID registered in the routing table of the electronic device 101.

According to various embodiments, in operation 605, the electronic device 101 may determine whether a plurality of programs (e.g., applications and/or applets) are present corresponding to the USSID of the received first UWB signal when the USSID is registered in the routing table. For example, the electronic device 101 may determine whether there are present programs (e.g., an application and/or applet) having the same USSID as the relevant USSID, based on program information registered in the OS of the electronic device 101. When the duplicated USSID is present in the program information, the programs (e.g., the applications or the applets) may perform an operation (e.g., payment) for the UWB security service, so a method for selecting one of the programs may be provided.

According to various embodiments, when there are a plurality of programs having the same USSID, the electronic device 101 may provide the first UI in operation 610. For example, the first UI may be a UI for selecting one (e.g., an application or an applet) of the plurality of programs associated with the payment service. For example, the programs associated with the same USSID may be a plurality of programs set by the user with respect to the same UWB security service. Hereinafter, various embodiments of a first UI 700 will be described with reference to FIG. 7. For example, the electronic device 101 may display the first UI 700 on at least a portion of a display (e.g., the display device 160 of FIG. 1). Hereinafter, the program may be referred to as an application and/or an applet.

According to various embodiments, at reference numeral 701, the first UI 700 may include the list of a plurality of programs to support the requested payment service. For example, the plurality of programs may be applications and/or applets associated with the same USSID. For example, the list of the programs may include first program information 710, second program information 720, and third program information 730. For example, the first program information 710 may include the description information (e.g., the name of a first program and/or an image (e.g., a banner) associated with the first program) of the first program and a selection UI 711. At reference numeral 701, the first program may be a program currently selected for the payment service. For example, the selection UI 711 may indicate that the first program is a program currently selected for the payment service. For example, a user may change a program to be used for the payment service through the input for the second program information 720 or the third program information 730 which may be indicated by UI selection 721 or 731.

According to various embodiments, at reference numeral 701, the first UI 700 may include additional information 740. For example, the additional information 740 may include ranging information 741.

Referring back to FIG. 6, according to various embodiments, in operation 615, the electronic device 101 may determine whether a selection input is received. For example, the electronic device 101 may determine whether a selection input for one of the plurality of programs included in the first UI 700 is received.

Figure 7:
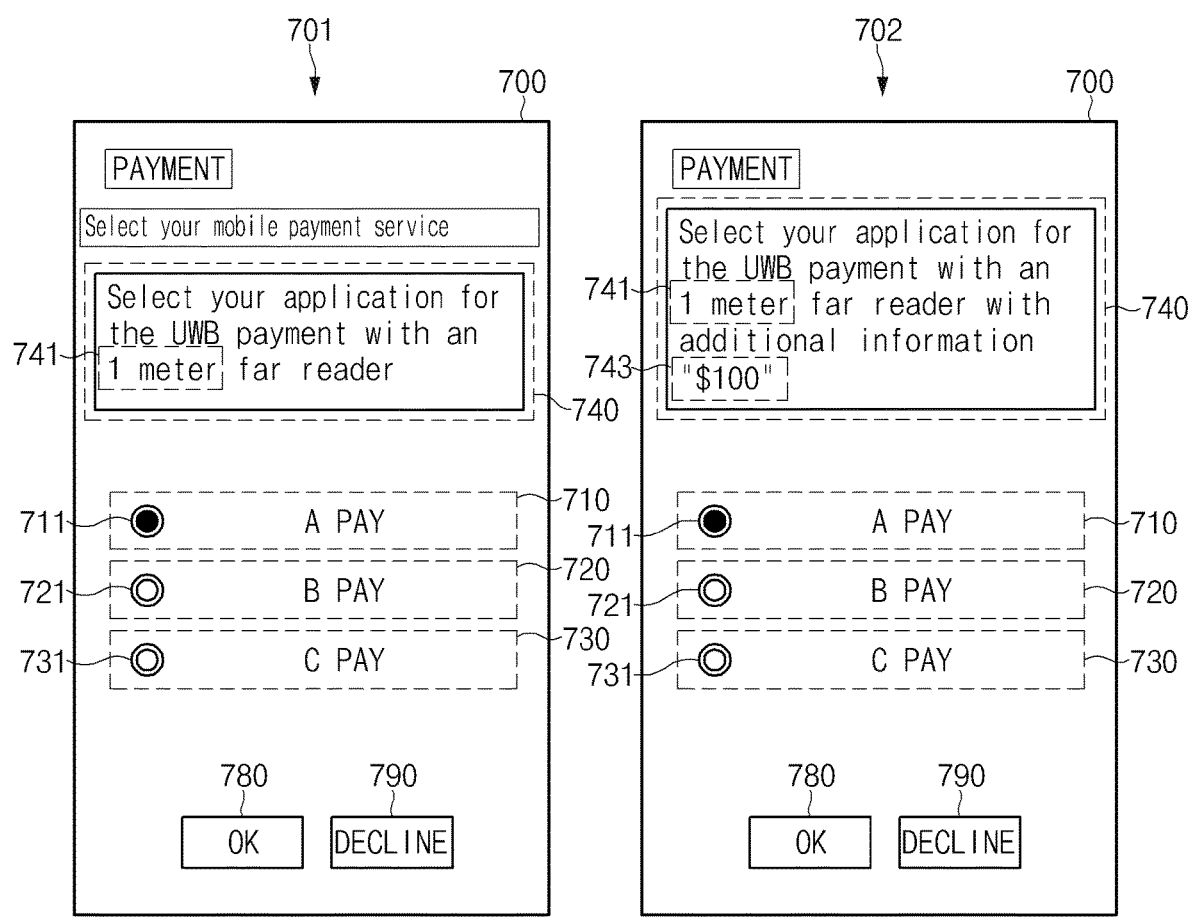
FIG. 7 is a diagram illustrating a first UI associated with payment according to various embodiments.

Referring back to reference numeral 701 of FIG. 7, according to an embodiment, the electronic device 101 may determine that the selection input is received for the selected program (e.g., the first program), when an input is received for the OK button 780. For example, the electronic device 101 may be configured to display the OK button 780 and/or the CANCEL button 790 on the first UI 700 when an input is received for one of the plurality of pieces of program information 710, 720, and/or 730.

According to an embodiment, when a specified input (e.g., a touch input, or a hold input for a specified time or more) is received for one of the displayed program information 710, 720, and 730, the electronic device 101 may determine that the selection input for the program associated with the specified input is received. For example, the electronic device 101 may omit the OK button 780 and/or the CANCEL button 790 from the first UI 700.

According to an embodiment, when a user input for the CANCEL button 790 is received, the electronic device 101 may determine that the selection input is failed to be received. According to an embodiment, the electronic device 101 may determine that the selection input is failed to be received, when an input is not received within a specified time after the first UI 700 is output. According to an embodiment, the electronic device 101 may determine that the selection input is failed to be received, when a specified input (e.g., the input for a power button or an input for a button of cancel) is received after the first UI 700 is output. When the selection input is not received, the electronic device 101 may terminate a present session for a payment service.

According to various embodiments, at reference numeral 702, the first UI 700 may include additional information 740. For example, the additional information 740 may include ranging information 741 and payment associated information 743 based on the additional information of the MAC payload IE (e.g., the USS IE 402 or 403 or an MPX IE including the USS IE) included in the first UWB signal.

Referring to reference numeral 701, according to an embodiment, the first UI 700 may also include information on a program having the permission state which is the state "Not-Allowed". For example, the permission state of the third program information 730 may be the state "Not-Allowed". When the duplicated USSID is present, the electronic device 101 may include the information of a program in the state "Not-Allowed" into the first UI 700. For example, a selection UI 731 of the third program information 730 in the state "Not-Allowed" may indicate that the third program is not able to be currently selected. For example, when the input for the program in the state "Not-Allowed" is received, the electronic device 101 may provide a UI to change the permission state of the program. For example, the electronic device 101 may ignore the input for the program in the state "Not-Allowed".

According to an example embodiment, the information on the program in the state "Not-Allowed" may have a display attribute different from the information on the program in the state "Allow" or "Undecided". For example, the electronic device 101 may display the third program information 730 with the display attribute different from the display attributes of the first program information 710 and the second program information 720. For example, the display attribute may include a type of display information, an amount of display information, a color, a color tone, brightness, a contrast, and/or a display position.

The UI format of FIG. 7 is provided for illustrative purposes, but the embodiments in the disclosure are not limited thereto. For example, the information (e.g., the third program information 730) of the program in the state "Not-Allowed" may not be displayed on the first UI 700.

Referring back to FIG. 6, according to various embodiments, in operation 615, the electronic device 101 may determine whether a selection input for one of programs having duplicated USSIDs is received. For example, when the selection input is not received (e.g., when an input for the CANCEL button 790 on the first UI is received), the electronic device 101 may terminate the session for the authentication procedure and the payment service. For another example, the electronic device 101 may perform operation 635 when the selection input is received in operation 615. For example, when the selection input is received, the electronic device 101 may determine that the authentication for the selected program is successfully performed, and may run the selected program (e.g., operation 635). For example, when the selection input for one of a plurality of programs included in the first UI 700 is received, the electronic device 101 may change the state of the permission for the selected program to the state "Allow in This Session", and execute the selected program. In this case, the first UI 700 may be used as an UI to simultaneously perform the selection and the authentication for the duplicated programs.

According to various embodiments, in operation 620, the electronic device 101 may determine whether there is present a program allowed with respect to the relevant USSID included in the first UWB signal. For example, when there is present a program registered in the routing table with respect to the USSID, the electronic device 101 may determine whether the program is allowed with respect to the UWB security service, using the permission information of the registered program. For example, when the permission for the program is not allowed (e.g., the permission state is the state "Not-Allowed"), the electronic device 101 may terminate the authentication procedure and the session. According to an embodiment, the electronic device 101 may perform operation 625 when the state of the permission for the program of the electronic device 101, which is associated with the USSID, is the state "Undecided", "Allow", or "Always Allow".

According to various embodiments, the electronic device 101 may provide a second UI in operation 625.

Figure 8:
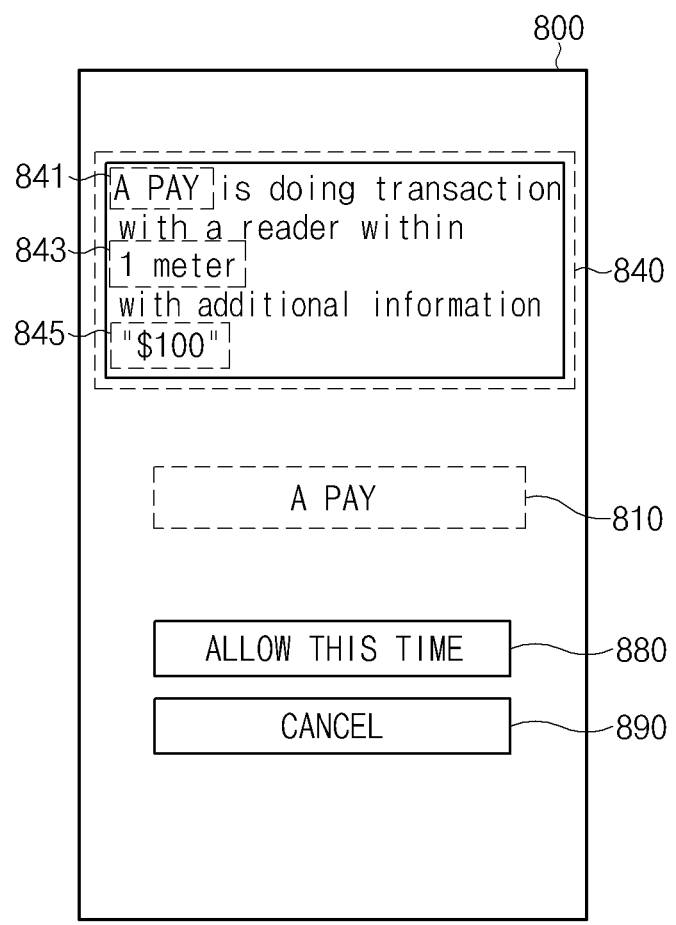
FIG. 8 is a diagram illustrating a second UI, according to various embodiments.

FIG. 8 is a diagram illustrating a second UI 800 according to various embodiments.

Referring to FIG. 8, according to various embodiments, the second UI 800 may include payment information 840, payment program information 810, a button 880 for allowing payment, and a button 890 for rejecting the payment. For example, the payment information 840 may include a name 841 of a program to currently perform payment, information 843 on the distance between the electronic device 101 and the external electronic device 501, and additional information 845 (e.g., information on an amount to be paid, a business name, and/or information on an item to be paid) included in a MAC payload IE (e.g., USS IE) of the first UWB signal. For example, the payment program information 810 may include an image (e.g., a banner) associated with the payment program.

According to an embodiment, the electronic device 101 may be regarded the payment for the session, which is currently being established, as being allowed by a user when the button 880 for allowing the payment is received. In this case, the electronic device 101 may change information on the permission for the program (e.g., A PAY), which is used for payment, in the routing table, from the state "Not-Allowed" to the state "Allow in This session".

According to an embodiment, the electronic device 101 may terminate the payment service session, which is being currently established, when the input for the button 890 for rejecting the payment is received. In this case, for example, the electronic device 101 may maintain the information on the permission for the program (e.g., A PAY), which is used for payment, in the routing table, in the state "Undecided"

According to various embodiments, in operation 630, the electronic device 101 may determine whether the input for allowance of the payment service is received. For example, when the input for the button 880 for allowing the payment is received onto the second UI 800 of FIG. 8, the electronic device 101 may determine that the input for allowance of the payment service is received. For another example, when the input for the button 890 for rejecting the payment is received onto the second UI 800 of FIG. 8, the electronic device 101 may determine that the input for the allowance of the payment service is not received.

According to various embodiments, in operation 635, the electronic device 101 may execute a program associated with the payment service when the input for the allowance is received.

Figure 9:
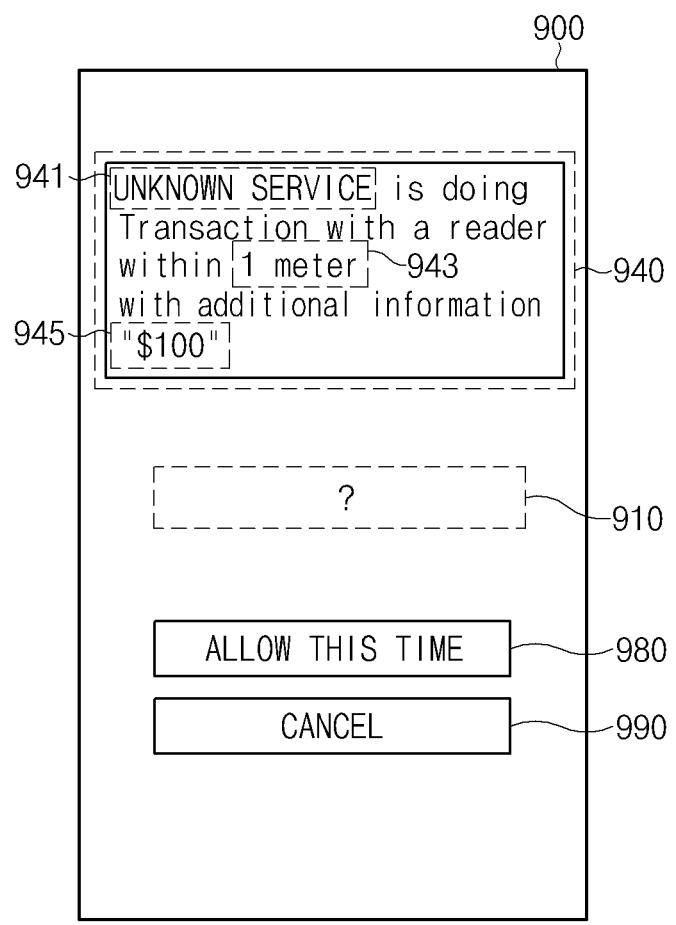
FIG. 9 is a diagram illustrating a third UI, according to various embodiments.

According to various embodiments, in operation 640, the electronic device 101 may provide a third UI 900 of FIG. 9 when the USSID is not registered.

FIG. 9 is a diagram illustrating the third UI 900 according to various embodiments.

Referring to FIG. 9, when the USSID is not registered, the electronic device 101 may provide the third UI 900. For example, the electronic device 101 may process the USSID, which is not registered, as a service associated with the payment. According to various embodiments, the third UI 900 may include payment information 940, program information 910, an allowance button 980, and a rejection button 990. For example, the payment information 940 may include information 941 for indicating that the requested UWB security service is not registered, information 943 on the distance between the electronic device 101 and the external electronic device 501, and additional information (e.g., information on an amount to be paid, a business name, and/or information on an item to be paid) included in a MAC payload IE (e.g., USS IE) of the first UWB signal. For example, the program information 910 may include an image for indicating that the UWB security service currently requesting payment is not registered.

Referring back to FIG. 6, in operation 645, the electronic device 101 may determine whether an input for the allowance of the third UI 900 is received. Referring to FIG. 9, according to an embodiment, when the input for the allowance button 980 is received, the electronic device 101 may regard the UWB security service, which is currently being provided, as being allowed by the user. In this case, the electronic device 101 may add the USSID to the routing table and may set the permission information to be in the state "Allow in This Session".

According to an embodiment, the electronic device 101 may terminate a session, which is currently being established, when the input for the rejection button 990 is received. In this case, for example, the electronic device 101 may add the USSID to the routing table and may set the permission information associated with the USSID to be in the state "Not-Allowed".

According to various embodiments, when the input for the allowance is received in operation 645 of FIG. 6, the electronic device 101 may regard the relevant UWB security service as a service associated with the payment, and may determine whether there are present a plurality of programs associated with the payment.

For example, referring back to FIG. 5, when the authentication procedure is successfully performed, the UWB communication circuitry 391 may transmit the information received through the first UWB signal to the secure element 340. According to an embodiment, the secure element 340 may run a specified program (e.g., a payment application) based on the transmitted information, and may perform payment authentication (e.g., biometric authentication or the input of a password) based on the payment procedure of the payment application. Although the authentication procedure of the payment application is omitted, those skilled in the art may understand that the authentication is performed based on a typical authentication procedure of the payment application. For example, when the payment authentication is successfully achieved, the secure element 340 may transmit the response information to the UWB communication circuitry 391 in operation 540.

According to various embodiments, in operation 545, the UWB communication circuitry 391 may transmit the second UWB signal including response information. For example, the second UWB signal may be a UWB signal including response information as the USS IE of the MAC payload IE.

According to various embodiments, when the authentication procedure in operation 530 is failed, the electronic device 101 may terminate the session. For example, the UWB communication circuitry 391 may not forward the received information to the secure element (e.g., operation 535). In this case, the electronic device 101 may ignore the first UWB signal received from the external electronic device 501.

According to various embodiments, the session may be terminated in operation 550 as the payment is terminated between the electronic device 101 and the external electronic device 501. In this case, for example, in operation 555, the UWB communication circuitry 391 may update the routing table. For example, the electronic device 101 may update the state of the permission for the payment application, which is set to be the state "Allow in This session" based on the authentication procedure 530, to the state "Undecided" after the session is terminated. The electronic device 101 may provide, for a user, a notification for asking whether payment is allowed, in every payment by updating the permission state to the state "Undecided" after the payment is terminated.

According to an embodiment, the external electronic device 501 may be a device (e.g., a device to support keyless entry) for services other than the payment service. For example, the UWB transaction of FIG. 5 may illustrate the flow of the signal for the UWB security service for the keyless entry. Hereinafter, the redundant description associated with the payment service may be omitted for the convenience of explanation.

According to various embodiments, in operation 505, the electronic device 101 and the external electronic device 501 commence a session.

According to various embodiments, in operation 510, the external electronic device 501 and the electronic device 101 may perform ranging.

According to various embodiments, in operation 515, the external electronic device 501 may determine whether the electronic device 101 is present at a specified distance or less (e.g., within a specified distance).

According to various embodiments, in operation 520, the external electronic device 501 may transmit a first UWB signal. For example, the first UWB signal may include information associated with a keyless entry. For example, the information associated with the keyless entry may be included in the MAC payload IE (e.g., the USS IE 402 or 403 or the MPX IE including USS IE). For example, the information associated with the keyless entry may include a UWB security service ID (USSID). For example, the information associated with the keyless entry may include information on a target (e.g., a vehicle model name) for the keyless entry. According to an embodiment, the MAC payload of the first UWB signal may include information indicating a proximity vehicle key system environment (PVKSE).

According to various embodiments, in operation 525, the UWB communication circuitry 391 may determine whether the UWB transaction requested through the first UWB signal is an allowed request. According to an embodiment, the UWB communication circuitry 391 may determine whether the UWB transaction is the allowed request, using the routing table (e.g., the mapping information). For example, the UWB communication circuitry 391 may determine whether the requested UWB transaction is the allowed request based on the permission state of the USSID of the first UWB signal. The UWB communication circuitry 391 may identify permission information specified to the USSID stored in the routing table. For example, when the permission state of the requested service is the state "Allow", or "Always Allow", the UWB communication circuitry 391 may provide a notification based on operation 527.

According to various embodiments, in operation 527, the electronic device 101 may provide, for the user, a notification of the UWB transaction for a program (e.g., an application and/or applet) set for the requested service. For example, the electronic device 101 may provide a notification depending on the notification method set for the program. For example, the notification method may include Vibration, Ring, Off, and/or Pop-Up.

Figure 10:
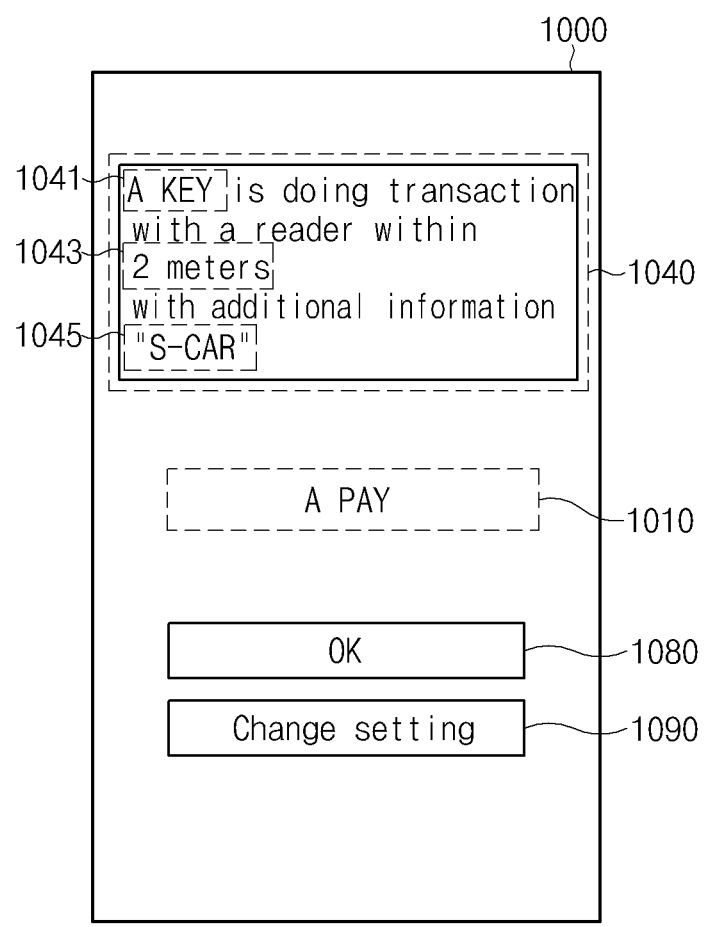
FIG. 10 is a diagram illustrating a notification UI, according to various embodiments.

FIG. 10 is a diagram illustrating an example notification UI 1000, according to various embodiments.

Referring to FIG. 10, according to an embodiment, the electronic device 101 may display, on at least a portion (e.g., the display device 160) of the display of the electronic device 101, the notification UI 1000 for the notification for the UWB transaction. For example, when the notification method is set to "Pop-UP", or set to another option other than "Off", the electronic device 101 may display the notification UI 1000. For example, the notification UI 1000 may include notification information 1040, associated program information 1010, an OK button 1080, and a button 1090 for setting changing. For example, the notification information 1040 may include the name 1041 of a program to perform present UWB transaction, information 1043 on the distance between the electronic device 101 and the external electronic device 501, and additional information 1045 (e.g., information on a reader) included in a MAC payload IE (e.g., USS IE) of the first UWB signal. For example, the associated program information 1010 may include an image (e.g., a banner) associated with a program associated with the UWB transaction.

According to an embodiment, the electronic device 101 may terminate displaying of the notification UI 1000 when a specified time is elapsed after the notification UI 1000 is displayed or the input for the OK button 1080 is received.

For example, when the state of the permission for the requested service is the state "Allow" or "Always Allow", the UWB communication circuitry 391 may transmit the information received through the first UWB signal to the secure element 340, in operation 535 referring back to FIG. 5.

According to an embodiment, when the state of the permission for the requested UWB security service is the state "Undecided", or the USSID of the requested UWB security service may not be registered in the routing table of the electronic device 101. In this case, the UWB communication circuitry 391 may determine the requested UWB security service as a request that is not allowed and may perform the authentication procedure 530. For example, the UWB communication circuitry 391 may perform the authentication procedure by transmitting the ranging information (e.g., information on the distance between the electronic device 101 and the external electronic device 501) and information of the MAC payload IE (e.g., the USS IE) of the first UWB signal to the processor 320.

Figure 11:
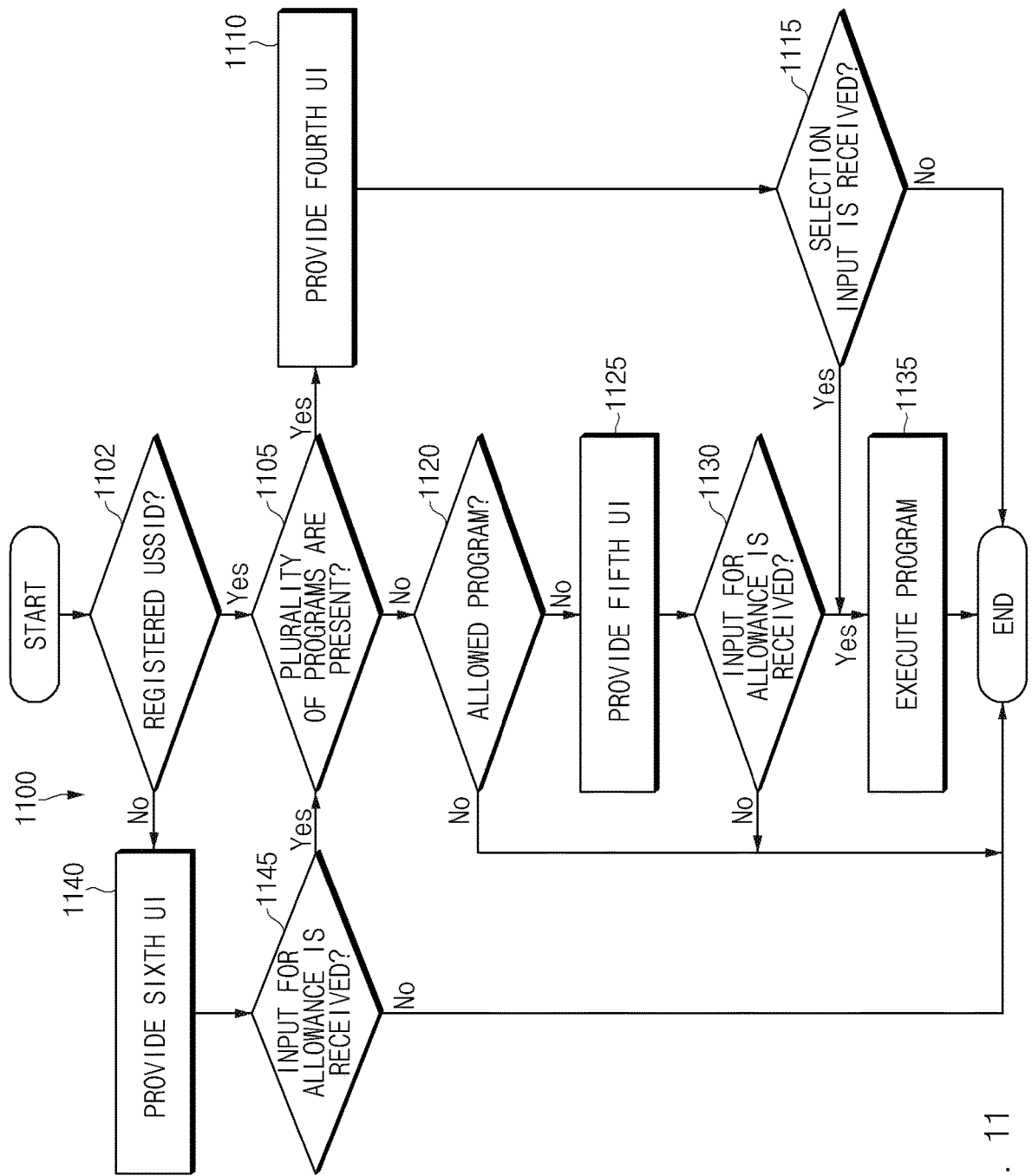
FIG. 11 is a flowchart illustrating an example authentication method, according to various embodiments.

FIG. 11 is a flowchart 1100 illustrating an example authentication method according to various embodiments. Hereinafter, the authentication procedure will be described with reference to FIG. 11 according to various embodiments. Hereinafter, the authentication procedure will be described with respect to the UWB transaction in addition to the payment service. Although the authentication procedures in the payment service and other services are described by separating FIG. 6 and FIG. 11 from each other due to the UI difference, the authentication procedure for the payment service and the authentication procedure for another service may be substantially identical or similar to each other. The two authentication procedures may be substantially identical to each other, except for the UI difference. Unless otherwise specified, the description of the authentication procedure made with reference to FIG. 6 will be applied to the description of the authentication procedure made with reference to FIG. 11.

According to various embodiments, in operation 1102, the electronic device 101 (e.g., the UWB communication circuitry 391) may determine whether the USSID of the received first UWB signal is registered in the routing table.

According to various embodiments, in operation 1105, the electronic device 101 (e.g., the UWB communication circuitry 391) may determine whether a plurality of programs (e.g., applications and/or applets) are present corresponding to the USSID of the received first UWB signal when the USSID of the received first UWB signal is registered in the routing table of the electronic device 101.

According to various embodiments, when there are present the duplicated USSID, the electronic device 101 may provide the fourth UI in operation 1110. For example, the fourth UI may be a UI to select one program (e.g., an application or an applet) of a plurality of programs associated with the UWB transaction.

Figure 12:
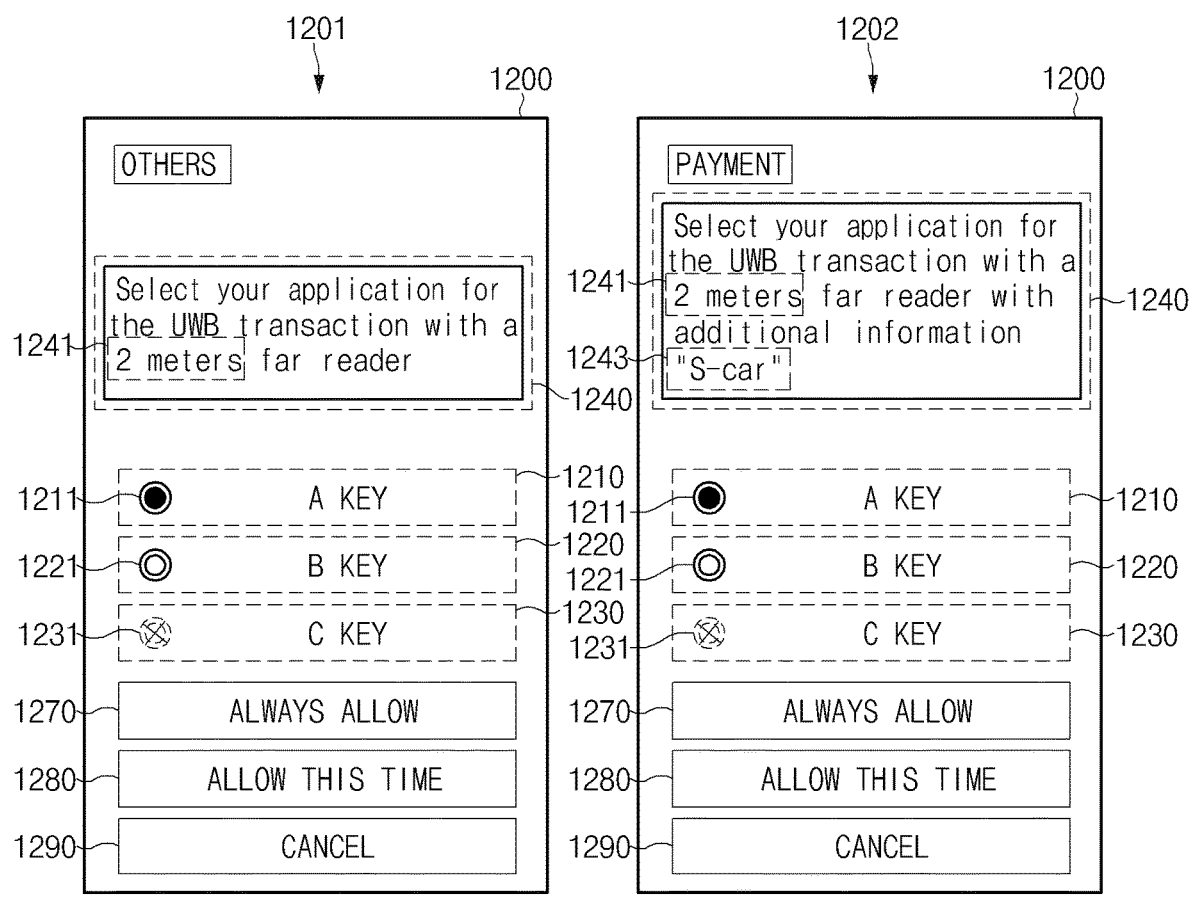
FIG. 12 is a diagram illustrating a fourth UI, according to various embodiments.

FIG. 12 is a diagram illustrating a fourth UI 1200 according to various embodiments. Hereinafter, the fourth UI 1200 will be described with reference to FIG. 12, according to various embodiments. For example, the electronic device 101 may display the fourth UI 1200 on at least a portion of a display (e.g., the display device 160 of FIG. 1) of the electronic device 101.

According to various embodiments, at reference numeral 1201, the fourth UI 1200 may include the list of a plurality of programs to support the requested UWB transaction. For example, the list of the programs may include first program information 1210, second program information 1220, and third program information 1230. For example, the first program information 1210 may include description information (e.g., the name of the first program and/or an image (e.g., a banner) associated with the first program and a selection UI 1211. At reference numeral 1201, the first program may be a program currently selected for the relevant UWB transaction. For example, the selection UI 1211 may indicate that the first program is the program selected for the UWB transaction. For example, the user may change the selection of a program for the present UWB transaction through the input to the second program information 1220.

According to various embodiments, the fourth UI 1200 may include additional information 1240. For example, the additional information 1240 may include ranging information 1241.

According to various embodiments, at reference numeral 1202, the fourth UI 1200 may include the additional information 1240. For example, the additional information 1240 may include the ranging information 1241 and information 1243 of the external electronic device 501 based on the additional information of the MAC payload IE (e.g., the USS IE) included in the first UWB signal.

Referring back to FIG. 11, in operation 1115, the electronic device 101 may determine whether an input of the allowance of the fourth UI 1200 is received after providing the fourth UI 1200. According to an embodiment, the electronic device 101 may determine whether the input for the allowance is received based on a specified input to the fourth UI 1200.

Referring to FIG. 7, according to an embodiment, the electronic device 101 may determine that the input for the permission for a selected program is received, when a specified user input is received after one of programs (e.g., the first program to the third program) is selected. For example, the electronic device 101 may determine that the input for the permission for the selected program is received, when the input to the first button 1270 or the second button 1280 is received, in the state that one of a plurality of pieces of program information 1210, 1220, or 1230 is selected (e.g., in the state of indicating that one selection UI has been selected). For example, when the input to the first button 1270 is received, the electronic device 101 may set the permission information of a program, which is currently selected, in the routing table to the state "Always Allows", and may execute the selected program (e.g., operation 1135). For another example, when the input to the second button 280 is received, the electronic device 101 may set the permission information of the program which is currently selected, to be in the state "Undecided".

According to an embodiment, when a specified input (e.g., a hold input for a specified time or more) is received for one of displayed program information 1210, 1220, and 123, the electronic device 101 may determine that the input for the allowance of a program associated with a specified input is received. For example, the electronic device 101 may omit the first button 1270, the second button 1280, and/or the third button 1290 from the fourth UI 1200.

According to an embodiment, when the user input to the third button 1290 is received, the electronic device 101 may determine that the input for the allowance is failed to be received. According to an embodiment, when the input is not received within a specified time after the fourth UI 1200 is output, the electronic device 101 may determine that the input for the allowance is failed to be received. According to an embodiment, when a specified input (for example, an input to a power button or an input to a cancel button) is received after the fourth UI 1200 is output, the electronic device 101 may determine that the input for the allowance is failed to be received. When the input for the allowance is not received, the electronic device 101 may terminate the present session for the UWB security service.

According to various embodiments, in operation 1120, the electronic device 101 may determine whether an allowed program is present with respect to the USSID included in the first UWB signal. For example, the electronic device 101 may determine whether the relevant program is a program allowed with respect to the UWB security service, using the permission information of the program associated with the USSID in the routing table. For example, when the permission for the program is not allowed (e.g., the permission state is the state "Not-Allowed"), the electronic device 101 may terminate the authentication procedure and the session. According to an embodiment, the electronic device 101 may perform operation 1125 when the state of the permission for the program of the electronic device 101, which is associated with the USSID, is the state "Undecided", or "Allow".

According to various embodiments, in operation 1125, when there is present a program (e.g., a program having the permission state "Undecided" or "Allow") allowed with respect to the relevant USSID, the electronic device 101 may provide a fifth UI.

Figure 13:
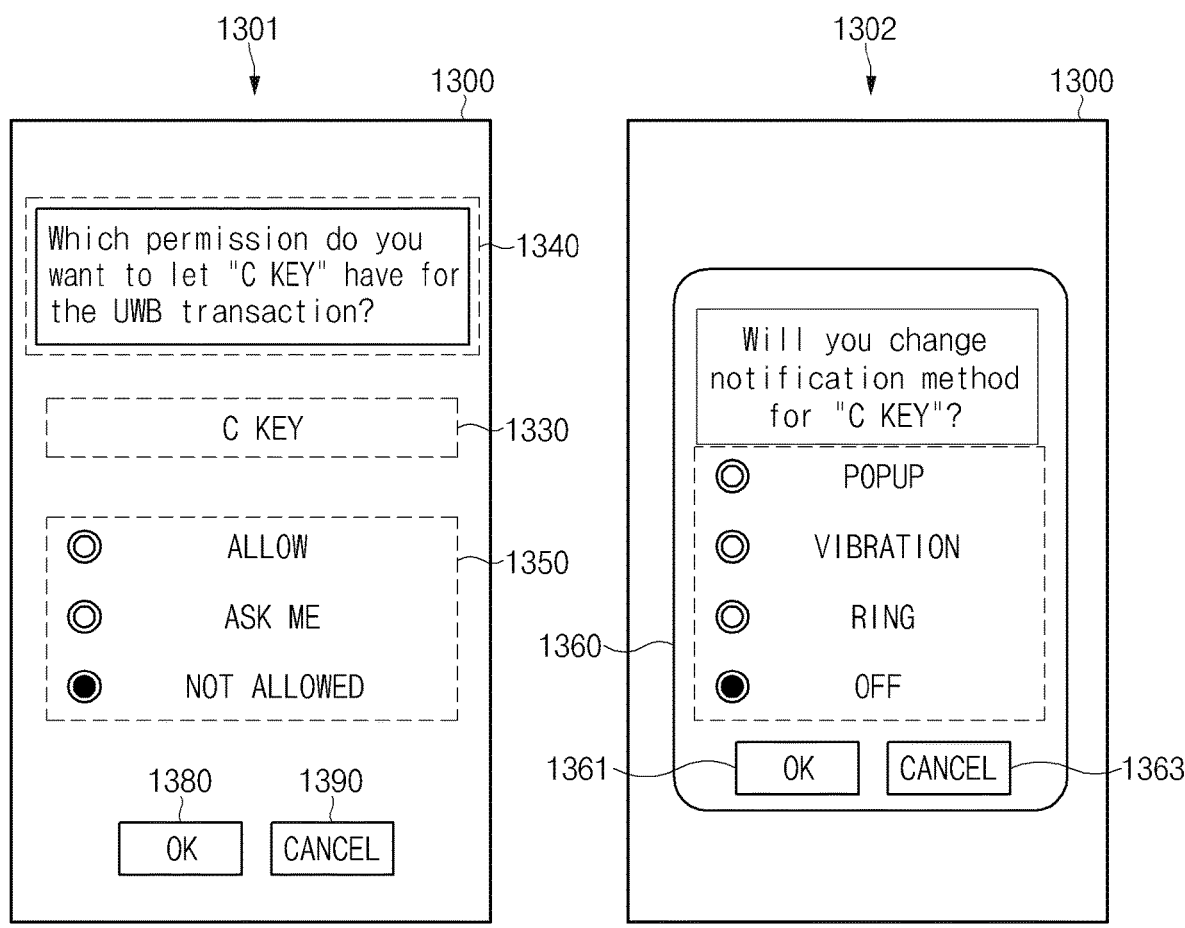
FIG. 13 is a diagram illustrating a fifth UI, according to various embodiments.

FIG. 13 is a diagram illustrating a fifth UI 1300 according to various embodiments.

Referring to FIG. 13, according to various embodiments, the fifth UI 1300 may include an interface to change the state of the permission for the selected program at reference numeral 1301. For example, the fifth UI 1300 may include a permission change guide 1340, permission change program information 1330, and a permission selection UI 1350. For example, the user may select the permission for a program through an input to the permission selection UI 1350. For example, after the user selects the permission, the user may store the selected permission information in the routing table of the electronic device 101 through an input to an OK button 1380. When an input for a CANCEL button 1390 is received, the electronic device 101 may not change the permission information for the relevant program.

According to an embodiment, the fifth UI 1300 may not include the OK button 1380 and/or the CANCEL button 1390. For example, when an input is received for "ALLOW" or "ASK ME" on the permission selection UI 1350, the electronic device 101 may determine that the input for the allowance has been received. As another example, when an input is received for the state "Not-Allowed" on the permission selection UI 1350, the electronic device 101 may determine that the input for the allowance is not received.

According to various embodiments, at reference numeral 1302, the fifth UI 1300 may further include a pop-up message including a notification method selection UI 1360 for selecting a notification method for a specific program. For example, the notification method selection UI 1360 may be provided when an input is received for the OK button 1380 at reference numeral 1301. The notification method selection UI 1360 is provided for illustrative purposes, and may be omitted.

According to various embodiments, the fifth UI 1300 of FIG. 13 may be provided for the user based on the input for the button 1090 for setting changing in FIG. 10, or permission information (e.g., 1211, 1221, and/or 1231) or the notification information (e.g., 1210, 1220, and/or 1230) in FIG. 12.

Referring again to FIG. 11, according to various embodiments, in operation 1130, the electronic device 101 may determine whether the input for the allowance of the UWB transaction is received. For example, when the permission for the relevant program is set to "ALLOW" or "ASK ME" based on the input to the fifth UI 1300 of FIG. 13, the electronic device 101 may determine that the input for the allowance has been received. For another example, when the permission for the relevant program is set to "Not-Allowed" based on the input for the fifth UI 1300 of FIG. 13, the electronic device 101 may determine that the input for the input for the allowance of the UWB transaction is not received.

According to various embodiments, in operation 1135, the electronic device 101 may execute a program associated with the UWB transaction when the input for the allowance is received.

Figure 18:
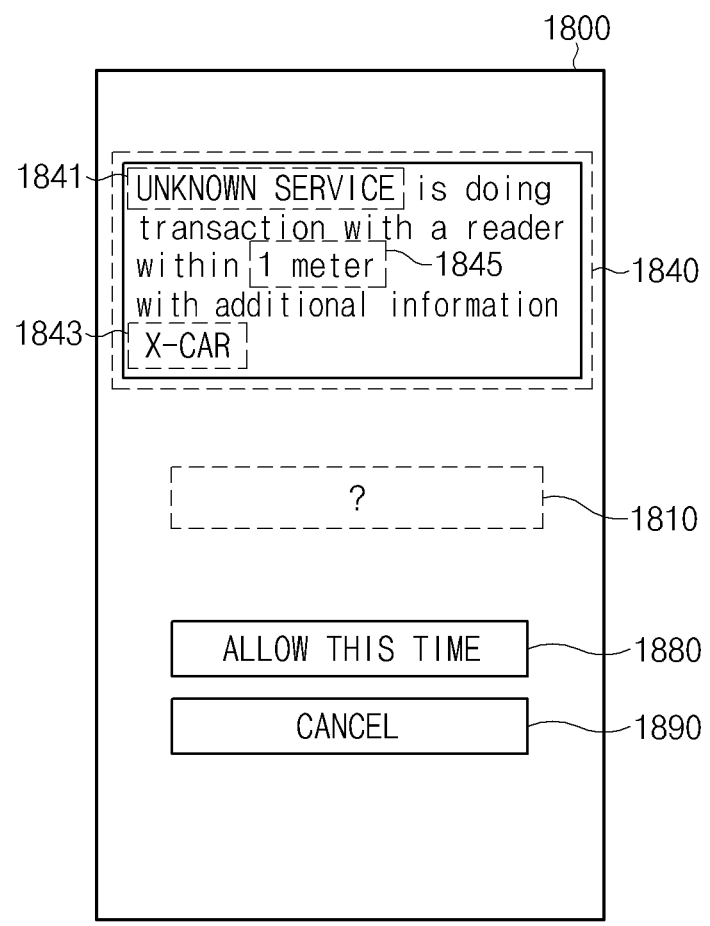
FIG. 18 is a diagram illustrating a sixth UI, according to various embodiments.

According to various embodiments, in operation 1140, the electronic device 101 may provide a sixth UI 1800 of FIG. 18 when the USSID is not registered.

FIG. 18 is a diagram illustrating the sixth UI 1800 according to various embodiments.

Referring to FIG. 18, when an USSID is not registered, the electronic device 101 may provide the sixth UI 1800. According to various embodiments, the sixth UI 1800 may include transaction information 1840, program information 1810, an allowance button 1880, and a rejection button 1890. For example, the transaction information 1840 may include information 1841 for indicating that the requested UWB security service is not registered, information 1845 on the distance between the electronic device 101 and the external electronic device 501, and additional information 1843 included in a MAC payload IE (e.g., USS IE) of the first UWB signal. For example, the program information 1810 may include an image for indicating that the UWB security service currently requesting transaction is not registered.

Referring back to FIG. 11, in operation 1145, the electronic device 101 may determine whether an input for the allowance of the sixth third UI 1800 is received. Referring to FIG. 18, according to an embodiment, when the input is received for the allowance button 1880, the electronic device 101 may regard the UWB security service, which is currently being provided, as being allowed by the user. In this case, the electronic device 101 may add the USSID to the routing table and may set the permission information to be in the state "Allow in This Session".

According to an embodiment, the electronic device 101 may terminate a session, which is currently being established, when the input for the rejection button 1890 is received. In this case, for example, the electronic device 101 may add the USSID to the routing table and may set the permission information associated with the USSID to be in the state "Not-Allowed".

According to various embodiments, when the input for the allowance is received in operation 1145 of FIG. 11, the electronic device 101 may determine whether there are present a plurality of programs (e.g., operation 605). In this case, the electronic device 101 may provide the fourth UI including all programs (e.g., remaining programs other than a program associated with the payment) to support transaction.

For example, referring back to FIG. 5, when the input for the allowance is received, the UWB communication circuitry 391 may transmit the information received through the first UWB signal to the secure element 340, based on operation 535. According to an embodiment, the secure element 340 may execute a specified program based on the transmitted information and the program may generate response information using the received information. For example, the secure element 340 may transmit the generated response information to the UWB communication circuitry 391.

According to various embodiments, in operation 545, the UWB communication circuitry 391 may transmit the second UWB signal including response information. For example, the second UWB signal may be a UWB signal including the response information serving as the MAC payload IE (e.g., USS IE).

According to various embodiments, the session may be terminated in operation 550 as the payment is terminated between the electronic device 101 and the external electronic device 501. According to an embodiment, operation 555 may be omitted.

Figure 14:
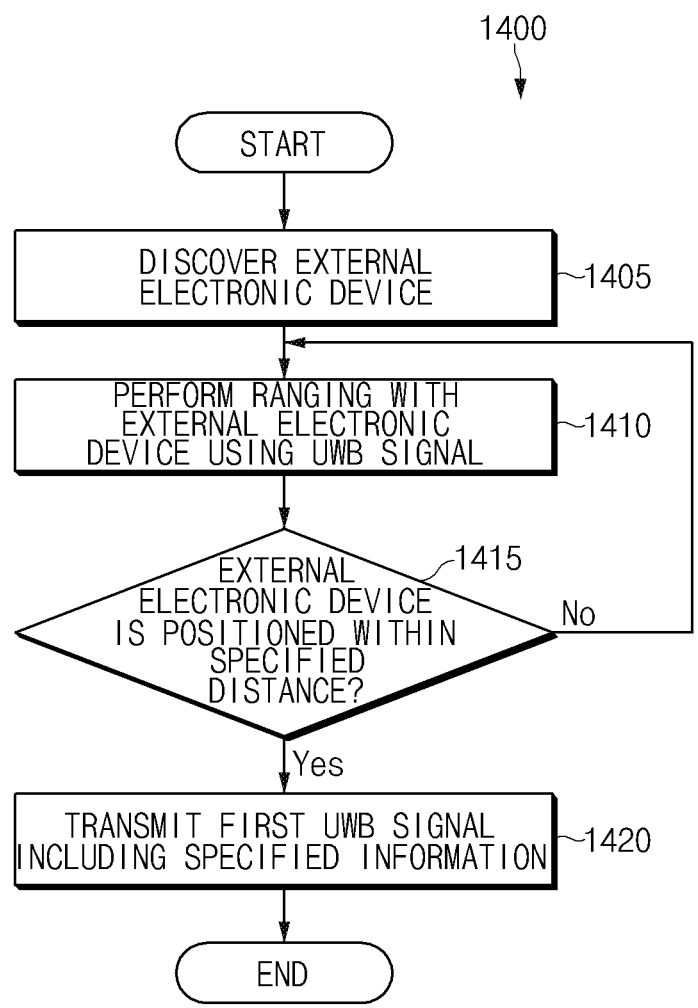
FIG. 14 is a flowchart illustrating an example method for transmitting a UWB signal, according to various embodiments.

FIG. 14 is a flowchart 1400 illustrating an example method for transmitting a UWB signal, according to various embodiments. In the embodiment of FIG. 14, the electronic device 101 may correspond to the external electronic device 501 of FIG. 5 and the external electronic device 501 may correspond to the electronic device 101 of FIG. 5.

According to various embodiments, in operation 1405, the electronic device (e.g., the external electronic device 501 of FIG. 5) may discover the external electronic device (e.g., the electronic device 101 of FIG. 5). For example, the electronic device may discover the external electronic device using through short-range wireless communication (e.g., Bluetooth, BLE, WiFi, and/or NAN). For example, the electronic device may discover the external electronic device by receiving a signal based on short-range wireless communication from the external electronic device. According to an embodiment, the electronic device may activate a communication module associated with a second communication protocol (e.g., UWB communication) when discovering the external electronic device based on a first communication protocol (e.g., Bluetooth, BLE, WiFi and/or NAN).

According to various embodiments, in operation 1410, the electronic device may perform ranging with the external electronic device using the UWB signal. For example, the electronic device may measure the distance between the external electronic device and the electronic device by transmitting a UWB signal and receiving a UWB signal including time information (e.g., time stamp) from the external electronic device.

In operation 1415, the electronic device may determine that the external electronic device is positioned at (e.g., within) a specified distance from the electronic device, based on a range. According to an embodiment, when the external electronic device is not positioned within a specified distance, the electronic device may continuously perform ranging in operation 1410. According to an embodiment, when the external electronic device is positioned within the specified distance, the electronic device may transmit the first UWB signal including the specified information in operation 1420. For example, the first UWB signal may include specified information. For example, the specified information may include information on the UWB transaction. For example, the specified information may be included in the MAC IE of the first UWB signal. For example, the specified information may refer to as information included in the USS IE 402 or 403 or the MPX IE including the USS IE.

Figure 15:
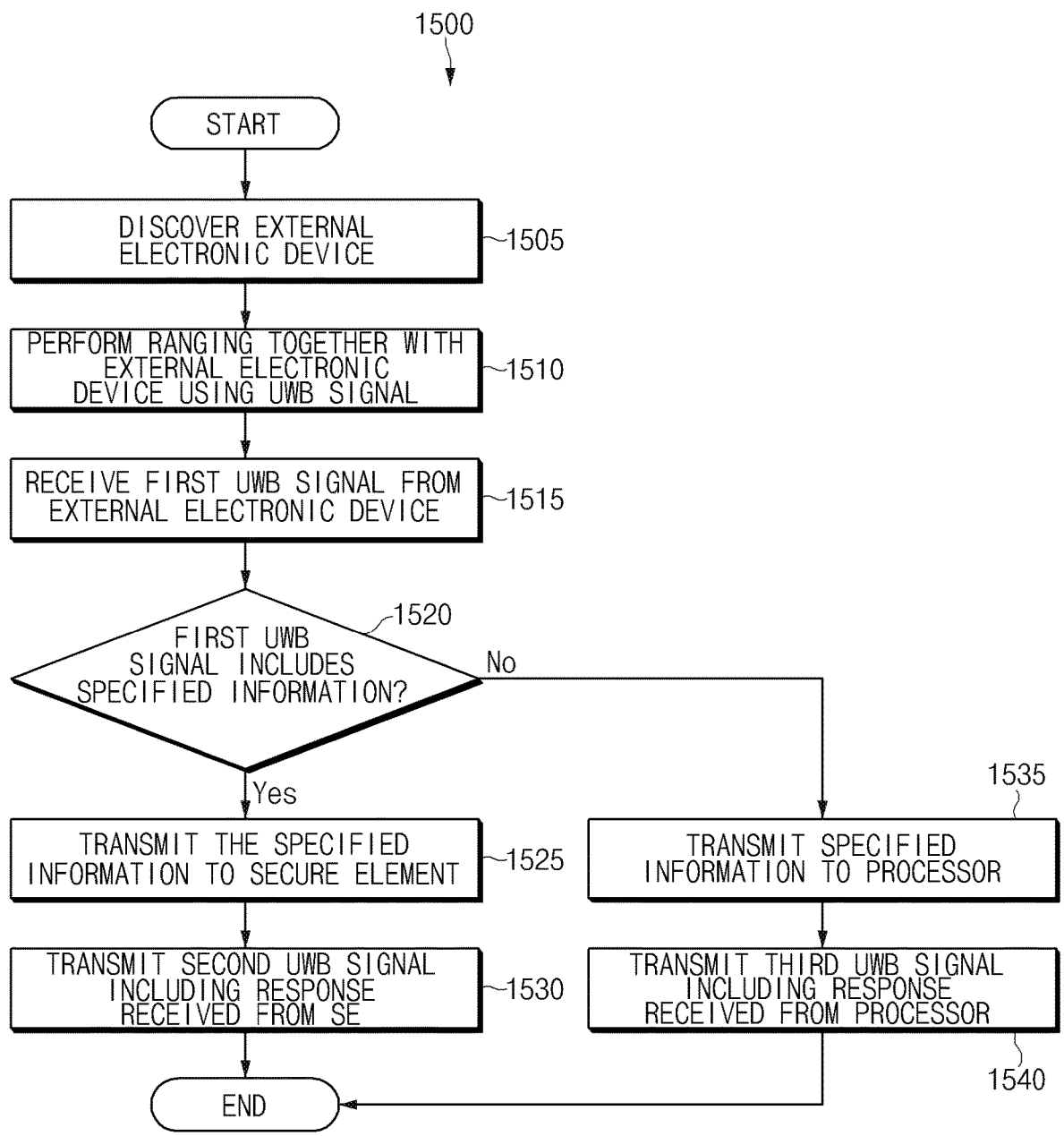
FIG. 15 is a flowchart illustrating an example method for transmitting a UWB signal, according to various embodiments.

FIG. 15 is a flowchart 1500 illustrating an example method for transmitting a UWB signal, according to various embodiments.

According to various embodiments, in operation 1505, the electronic device (e.g., the electronic device 101 of FIG. 5) may discover an external electronic device (e.g., the external electronic device 501 of FIG. 5). For example, the electronic device 101 may discover the external electronic device using the short-range wireless communication (e.g., Bluetooth, BLE, and/or NAN) with the external electronic device 501. For example, the electronic device 101 may discover the external electronic device 501 by receiving a signal based on short-range wireless communication from the external electronic device 501.

According to various embodiments, in operation 1510, the electronic device 101 (e.g., the UWB communication circuitry 391 of FIG. 3) may perform ranging with the external electronic device using a UWB signal. For example, the electronic device 101 may receive the UWB signal and may transmit a UWB signal including time information (e.g., a time stamp) to the external electronic device 501.

According to various embodiments, in operation 1515, the electronic device 101 may receive a first UWB signal from the external electronic device 501. For example, the first UWB signal may include specified information. For example, the specified information may include information on the UWB transaction. For example, the specified information may be included in the MAC IE of the first UWB signal. For example, the specified information may refer to information included in the USS IE 402 or 403 or the MPX IE including the USS IE.

According to various embodiments, in operation 1520, the electronic device 101 may determine whether the first UWB signal includes specified information. For example, the electronic device 101 may determine whether the MAC payload IE of the first UWB signal includes an identifier for specified UWB transaction. For example, the electronic device 101 may determine whether the MAC payload IE of the first UWB signal includes a USSID. According to an embodiment, the electronic device 101 may determine whether the MAC payload IE of the first UWB signal includes an identifier for the specified UWB transaction, using the USSID and the mapping information (e.g., a routing table) of the electronic device 101. For example, the electronic device 101 may determine whether the USSID included in the received MAC payload IE is a USSID registered in the mapping information of the electronic device 101. For example, the mapping information may include information on a mapping relationship between the USSID and programs of the electronic device 101.

According to various embodiments, in operation 1525, when the first UWB signal includes specified information, the electronic device 101 may transmit the specified information to a secure element (SE) (e.g., the secure element 340). For example, the electronic device 101 may transmit the USSID of the specified information and ranging information (e.g., the information on the distance between the electronic device 101 and the external electronic device 501) to the SE. For example, the electronic device 101 may perform the authentication procedure (for example, operation 530) described above with reference to FIG. 5 by transmitting the specified information to the SE.

According to various embodiments, in operation 1530, the electronic device 101 may transmit the second UWB signal including the response received from the SE. For example, the second UWB signal may include response information to the requested UWB transaction. For example, when the authentication procedure is successfully performed using the received specified information, the SE may forward (e.g., transmit or deliver) the response information to the UWB communication circuitry. The UWB communication circuitry may transmit the second UWB signal including the received response information.

According to various embodiments, in operation 1535, when the first UWB signal does not include the specified information, the electronic device 101 may transmit the specified information to the processor (e.g., the processor 320 of FIG. 3). In operation 1540, the electronic device 101 may transmit the third UWB signal including the response received from the processor. For example, the third UWB signal may include response information, which is processed by a processor (e.g., the processor 320 of FIG. 3) independent from the SE or the OS of the electronic device 101. For example, when the first UWB signal does not include the specified information, the electronic device 101 may determine that the first UWB signal is not associated with a security service through UWB communication.

Figure 16:
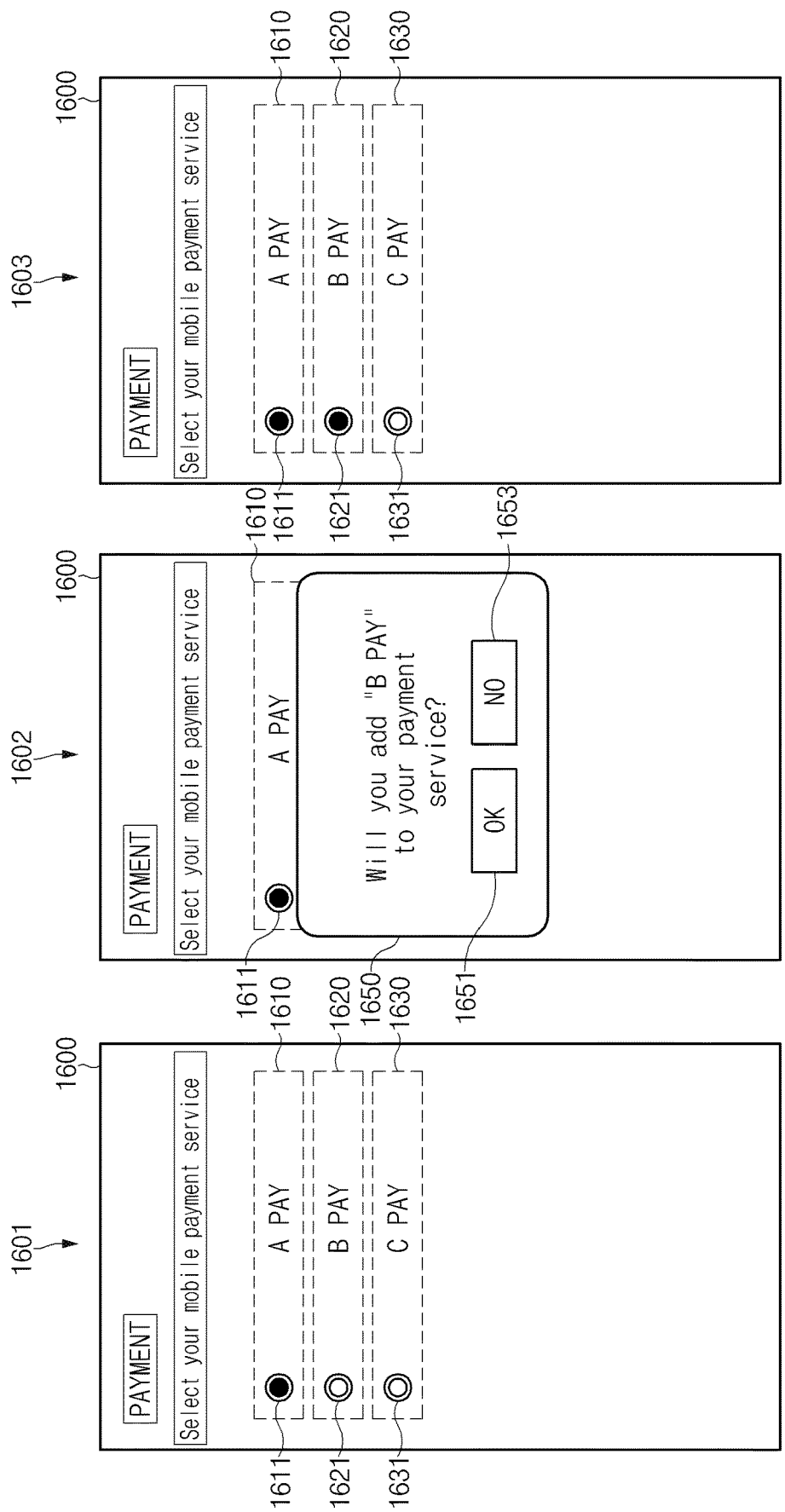
FIG. 16 is a diagram illustrating an example setting UI, according to various embodiments.

FIG. 16 is a diagram illustrating an example setting UI 1600, according to various embodiments.

As described above with reference to FIGS. 7 and 12, a plurality of programs may be stored with respect to the same USSID in the routing table. According to various embodiments, the electronic device 101 may provide the setting UI 1600 for setting at least one program to be used for each UWB security service. For example, when the program associated with the specific USSID is installed in the electronic device 101, when a user input associated with the execution of the setting UI 1600 is received, or when the UWB signal including the USSID is received (e.g., when there is absent a specified program with respect to the USSID), the electronic device 101 may provide the setting UI 1600. Although the embodiment in FIG. 16 is described while focusing on the payment service, the setting UI may be provided even for other services in a similar manner.

According to various embodiments, in reference numeral 1601, the setting UI 1600 may include a plurality of pieces of program information associated with the payment service. For example, the setting UI 1600 may include first program information 1610, second program information 1620, and/or third program information 1630 associated with the payment service. For example, a selection UI 1611 of the first program information 1610 may indicate that the program selected for the present payment service is a first program. The second program information 1620 and the third program information 1630 may each include a selection UI 1621, 1631, respectively.

According to various embodiments, a user may want to use a plurality of programs for a payment service. In this case, a user may set a plurality of programs for the payment service, may select one of the plurality of programs (e.g., the first UI 700 of FIG. 7 or the fourth UI 1200 of FIG. 12) set for the payment service, and may perform the payment service using the selected program. For example, a user may want to set "B PAY" in addition to "A PAY" as a program associated with the payment service. In this case, the user may perform input on the second program information 1620.

According to various embodiments, at reference numeral 1602, when the electronic device 101 receives an input to the second program information 1620, the electronic device 101 may provide a pop-up image 1650 on the setting UI 1600 including an OK button 1651 and a NO button 1653. For example, at reference numeral 1601, when a user input is received for the second program information 1620, the electronic device 101 may provide the pop-up image 1650 to ask whether to add the second program as a program for a payment service.

According to an embodiment, when a user input for an OK button 1651 of the pop-up image 1650 is received, the electronic device 101 may add the second program as a program associated with a payment service. In this case, at reference numeral 1603, the selection UI 1621 of the second program information 1620 may indicate that the second program is set as the program associated with the payment service.

According to various embodiments, the pop-up image 1650 at the reference numeral 1602 may be omitted. For example, when an input is received for the second program information 1620 at reference numeral 1601, the electronic device may change the state of the selection UI 1621 as in the selection UI 1621 at the reference numeral 1603.

Figure 17:
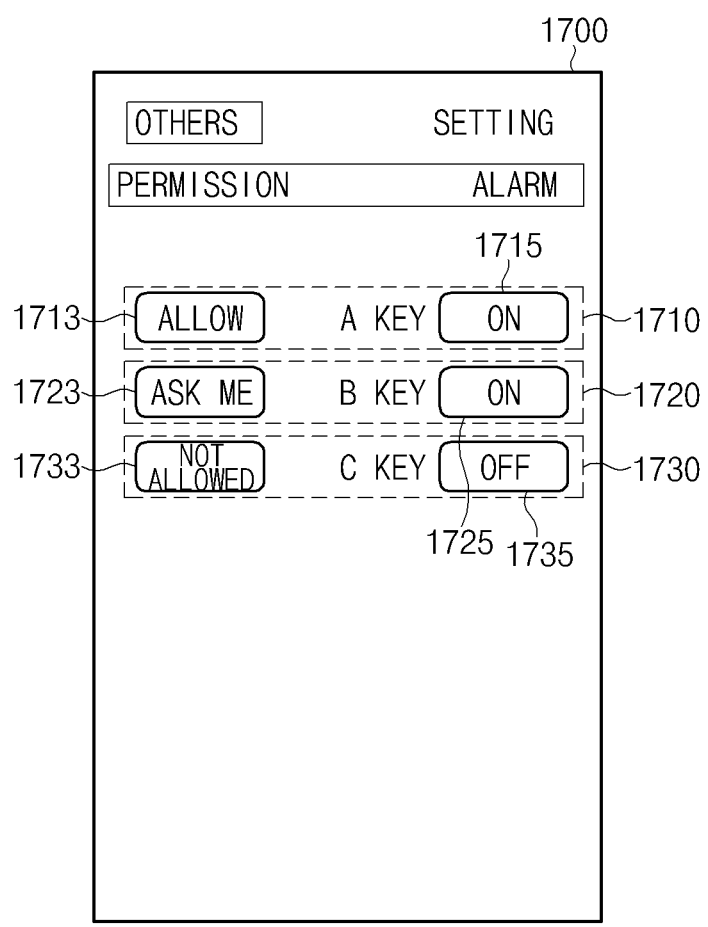
FIG. 17 is a diagram illustrating an example setting UI, according to various embodiments.

FIG. 17 is a diagram illustrating an example setting UI 1700, according to various embodiments.

According to various embodiments, the setting UI 1700 may include a notification setting and information on the permission state of each program. For example, permission information 1713 of the first program information 1710 may correspond to the state "Allow" (e.g., "Always allows") and a notification method 1715 may correspond to a state "On". For example, permission information 1723 of second program information 1720 may correspond to the state "ASK ME" 1723 (e.g., "Undecided"), and a notification method 1725 may correspond to the state "On". For example, permission information 1733 of third program information 1730 may correspond to the state "Not-Allowed" (e.g., "Deny") and a notification method 1735 may correspond to the state "Off".

According to an embodiment, when an input is received for the permission information (e.g., the permission information 1713), the electronic device 101 may provide an additional menu (e.g., a drop-down menu or a pop-up menu) to change the permission information and change permission information (e.g., the permission information 1713) based on the user input for the additional menu. For example, the additional menu may include the states "ALLOW", "ASK ME", and "Not-Allowed" as selectable options.

According to an embodiment, when an input is received for a notification method (e.g., the notification method 1715), the electronic device 101 may provide an additional menu (e.g., a drop-down menu or a pop-up menu) to change the notification method and may change the state of the notification method (e.g., the notification method 1715) based on the user input for the additional menu. For another example, the electronic device 101 may change the state of the notification method (e.g., the notification method 1715) based on the user input when an input is received for the notification method (e.g., the notification method 1715).

According to an embodiment, the electronic device 101 may provide an additional UI when an input is received for the permission information. For example, the electronic device 101 may provide a UI having the form similar to the form represented as reference numeral 1301 of FIG. 13. According to an embodiment, the electronic device may provide an additional UI when an input for the notification method is received. For example, the electronic device 101 may provide a UI having the form similar to the form represented at reference numeral 1302 of FIG. 13.

The setting UI 1700 described with reference to FIG. 17 is provided for illustrative purposes, but embodiments in the disclosure are not limited thereto.

According to various embodiments, an electronic device (e.g., the electronic device 101 of FIG. 3) may include communication circuitry (e.g., the communication circuitry 390 of FIG. 3) configured to perform short-range wireless communication, ultra-wideband (UWB) communication circuitry (e.g., the UWB communication circuitry 391) configured to perform UWB communication, a secure element (e.g., the secure element 340 of FIG. 3) comprising a secure data storage configured to provide an execution environment isolated from an operating system (OS) of the electronic device, and a processor (e.g., the processor 320 of FIG. 3) operatively connected with the communication circuitry, the UWB communication circuitry, and the secure element. According to an embodiment, the UWB communication circuitry is configured to perform ranging with an external electronic device (e.g., the external electronic device of FIG. 5), to receive a first UWB signal including a medium access control (MAC) header (e.g., the header of FIG. 4) and a MAC payload (e.g., the payload of FIG. 4) from the external electronic device, and to determine, based at least on MAC payload information (e.g., the payload information element 460 of FIG. 4) included in the MAC payload, whether to forward information included in the MAC payload information to the secure element.

According to an embodiment, the UWB communication circuitry may be configured to determine whether to forward the information included in the MAC payload information to the secure element using an identifier included in the MAC payload information and mapping information stored at an upper layer (e.g., the upper layer 303 of FIG. 3) of a MAC layer (e.g., the MAC layer 302 of FIG. 3), and the mapping information may include permission information, set for the identifier for access to the secure element.

According to an embodiment, the MAC payload information (e.g., USS IE 402 or 403 or an MPX IE including the USS IE) includes the identifier (e.g., the USSID) associated with UWB transaction through UWB communication. For example, the MAC payload information may further include near field communication (NFC) protocol information (e.g., the Technical 451 and/or the Protocol 452 of the first USS IE 402 or the Payload Type 498 of the second USS IE 403) associated with the UWB transaction.

According to an embodiment, the electronic device may further include a display (e.g., the display 160 of FIG. 1). For example, the UWB communication circuitry may be configured to cause the display to display, on the display, a user interface (UI) (e.g., the first UI 700 of FIG. 7, the second UI 800 of FIG. 8, the third UI 900 of FIG. 9, the fourth UI 1200 of FIG. 12, and/or the fifth UI 1300 of FIG. 13) to ask whether to allow the UWB transaction using the processor, based on the first UWB signal being received, and to forward the MAC payload information to the secure element based on a user input for allowing the UWB transaction being received through the UI.

For example, the UWB communication circuitry may be configured to forward the MAC payload information and information on a distance between the electronic device and the external electronic device, based on the user input for allowing the UWB transaction being received. For example, the information on the distance may be obtained through the ranging, and the UI may include the information on the distance and information on a program associated with an identifier associated with the UWB transaction.

For example, the MAC payload information may further include additional information (e.g., a price, a model name, a product name, and/or a business name) associated with the UWB transaction, and the UI may further include the additional information.

According to an embodiment, the secure element may be configured to execute a program corresponding to the identifier of the MAC payload information element when the MAC payload information element is received, and to perform user authentication (e.g., fingerprint authentication, iris authentication, face ID authentication, and/or password authentication) through the program.

According to an embodiment, the secure element may be configured to forward response information to the MAC payload information element to the UWB communication circuitry, based on the user authentication being successfully performed, and the UWB communication circuitry may be configured to transmit a second UWB signal including the response information to the external electronic device.

According to an embodiment, the processor may be configured to perform the ranging by activating the UWB communication circuitry, based on discovering the external electronic device based on Bluetooth low energy (BLE) communication, Bluetooth, neighbor awareness networking (NAN) communication, or wireless fidelity (Wi-Fi) communication, using the communication circuitry.

According to an embodiment, the UWB communication circuitry may be configured to cause a display to display a user interface (e.g., the first UI 700 of FIG. 7 or the fourth UI 1200 of FIG. 12) for selecting a program to be used for the UWB transaction using the processor, based on the first UWB signal being received, and a plurality of programs being present corresponding to the identifier.

According to various embodiments, an electronic device (e.g., an external electronic device 501) may include communication circuitry (e.g., the communication circuitry of FIG. 3) configured to perform short-range wireless communication, ultra-wideband (UWB) communication circuitry (e.g., the UWB communication circuitry 391 of FIG. 3) configured to perform UWB communication, and a processor (e.g., the processor 320 of FIG. 3) operatively connected with the communication circuitry and the UWB communication circuitry. The UWB communication circuitry may be configured to perform ranging with an external electronic device (e.g., the electronic device 101 of FIG. 5) using a UWB signal, to determine whether the external electronic device is positioned within a specified distance from the electronic device, based on the ranging, and to transmit a first UWB signal including medium access control (MAC) payload information specified to request a UWB transaction to the external electronic device, based on the external electronic device being positioned within the specified distance.

For example, the MAC payload information may include an identifier associated with the UWB transaction. The MAC payload information may further include information on a near field communication (NFC) protocol associated with the UWB transaction.

For example, the processor may be configured to activate the UWB communication circuitry, based on discovering the external electronic device based on Bluetooth low energy (BLE) communication, Bluetooth, neighbor awareness networking (NAN) communication, or wireless fidelity (Wi-Fi) communication, using the communication circuitry, and to allow the UWB communication circuitry to perform the ranging.

For example, the electronic device may an electronic device (e.g., the vehicle 203, the laptop 204, or the gate 305 of FIG. 2) that supports a point of sales (POS) terminal or a keyless entry.

According to various embodiments, a method for ultra-wideband (UWB) transaction of an electronic device (e.g., the electronic device 101 of FIG. 3) may include performing ranging with an external electronic device using a UWB signal, receiving a first UWB signal including a medium access control (MAC) header and a MAC payload from the external electronic device, based on the ranging, and forwarding, based at least on medium access control (MAC) payload information included in the MAC payload, information included in the MAC payload information element to a processor of the electronic device or a secure element of the electronic device isolated from the processor.

According to an embodiment, the method for the UWB transaction may further include determining whether to forward the MAC payload information to the secure element, using an identifier included in the MAC payload information and mapping information stored at an upper layer of a MAC layer, and the mapping information includes permission information, which is set for the identifier, for access to the secure element.

According to an embodiment, the MAC payload information may include information on the identifier associated with UWB transaction through UWB communication and near field communication (NFC) protocol information associated with the UWB transaction.

According to an embodiment, the method for the UWB transaction may further include displaying, on a display of the electronic device, a user interface (UI) configured to ask whether to allow the UWB transaction based on the first UWB signal being received, and forwarding the MAC payload information to the secure element based on a user input for allowing the UWB transaction being received through the UI.

According to an embodiment, the method for the UWB transaction may further include forwarding the MAC payload information and information on a distance between the electronic device and the external electronic device to the secure element, based on the user input for allowing the UWB transaction being received through the UI, the information on the distance may be obtained through the ranging, and the UI may include the information on the distance and information on a program associated with an identifier associated with the UWB transaction.

According to an embodiment, the MAC payload information may further include additional information associated with the UWB transaction, and the UI further may include the additional information.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, the transaction ensured in security may be provided using the UWB transaction.

According to various embodiments of the disclosure, the electronic device may provide an intuitive keyless entry through the UWB transaction.

A variety of effects directly or indirectly understood through the disclosure may be provided.

While the disclosure has been illustrated and described with reference to various example embodiments thereof, it will be understood by those skilled in the art that various changes in form and details may be made therein without departing from the spirit and scope of the disclosure as defined, for example, by the appended claims and their equivalents.

What is claimed is:

1. An electronic device comprising:
a secure element comprising a secure data storage;
wireless communication circuitry supporting ultra-wideband (UWB) communication;
a processor; and
a memory including stored instructions, which when executed by the processor, cause the electronic device to:
perform a ranging operation to identify a distance between the electronic device and an external electronic device using the wireless communication circuitry,
determine the identified distance is within a defined distance,
while the electronic device and the external electronic device are within the defined distance from each other, receive a UWB signal including a medium access control (MAC) header and a MAC payload from the external electronic device, the MAC payload including a UWB secure service identifier (USSID) identifying at least one service associated with a transaction, and
route the USSID to the secure element based on the MAC payload.

2. The electronic device of claim 1, wherein the USSID is included in a MAC payload information element of the MAC payload.

3. The electronic device of claim 2, wherein the MAC payload information element corresponds to a multiplexed information element.

4. The electronic device of claim 3, wherein an upper-frame fragment field of the multiplexed information element includes the MAC payload information element.

5. The electronic device of claim 3, wherein the multiplexed information element includes a transaction identifier of the transaction.

6. The electronic device of claim 2, wherein the MAC payload information element includes payload type information indicating type of the USSID.

7. The electronic device of claim 1, wherein the USSID includes an application identifier or a system code for the transaction.

8. The electronic device of claim 2, wherein the MAC payload information element further includes additional information associated with the transaction.

9. The electronic device of claim 2,
wherein the processor is further configured to route at least a part of the MAC payload information element to the secure memory based on the USSID.

10. The electronic device of claim 9, wherein the processor is further configured to determine access for the secure memory based on the USSID.

11. A method for an electronic device comprising:
performing a ranging operation to identify a distance between the electronic device and an external electronic device based on ultra wideband (UWB) communication;
determining the identified distance is within a defined distance;
while the electronic device and the external electronic device are within the defined distance from each other, transmitting a UWB signal including a medium access control (MAC) header and a MAC payload to the external electronic device based on the ranging operation,
the MAC payload including a USSID (UWB secure service identifier) for a transaction; and
routing the USSID to a secure element of the electronic device based on the MAC payload.

12. The method of claim 11, wherein the USSID is included in a MAC payload information element of the MAC payload.

13. The method of claim 12, wherein the MAC payload information element corresponds to a multiplexed information element.

14. The method of claim 13, wherein an upper-frame fragment field of the multiplexed information element includes the MAC payload information element.

15. The method of claim 13, wherein the multiplexed information element includes a transaction identifier of the transaction.

16. The method of claim 12, wherein the MAC payload information element includes payload type information indicating type of the USSID.

17. The method of claim 11, wherein the USSID includes an application identifier or a system code for the transaction.

18. The method of claim 12, wherein the MAC payload information element further includes additional information associated with the transaction.

19. The method of claim 11, further comprising:
determining whether to transmit the UWB signal based on a distance the identified distance from the ranging.

20. The method of claim 19, wherein the transmitting the UWB signal comprises transmitting the UWB signal to the external electronic device when the external electronic device is located within the defined distance from the electronic device.

* * * * *